United States Patent
Zhang et al.

(10) Patent No.: US 11,558,841 B2
(45) Date of Patent: Jan. 17, 2023

(54) UPLINK SYNCHRONIZATION METHOD, AND APPARATUS

(71) Applicant: Huawei Technologies Co., Ltd., Shenzhen (CN)

(72) Inventors: Zhang Zhang, Shanghai (CN); Yongzhao Cao, Shanghai (CN); Zhe Liu, Shanghai (CN); Jinlin Peng, Shanghai (CN); Zhi Li, Shanghai (CN); Fan Wang, Berkshire (GB)

(73) Assignee: Huawei Technologies Co., Ltd., Shenzhen (CN)

( * ) Notice: Subject to any disclaimer, the term of this patent is extended or adjusted under 35 U.S.C. 154(b) by 246 days.

(21) Appl. No.: 16/991,189

(22) Filed: Aug. 12, 2020

(65) Prior Publication Data

US 2020/0374826 A1  Nov. 26, 2020

Related U.S. Application Data

(63) Continuation of application No. PCT/CN2019/074264, filed on Jan. 31, 2019.

(30) Foreign Application Priority Data

Feb. 13, 2018 (CN) .......................... 201810151028.3
Apr. 4, 2018 (CN) .......................... 201810302366.2

(51) Int. Cl.
*H04W 56/00* (2009.01)
*H04L 5/00* (2006.01)
*H04L 5/14* (2006.01)

(52) U.S. Cl.
CPC ....... *H04W 56/0045* (2013.01); *H04L 5/0094* (2013.01); *H04L 5/1469* (2013.01); *H04W 56/001* (2013.01)

(58) Field of Classification Search
CPC ............ H04W 56/001; H04W 56/004; H04W 56/0045; H04L 5/001; H04L 5/0092; H04L 5/0094; H04L 5/1469
See application file for complete search history.

(56) References Cited

U.S. PATENT DOCUMENTS

2011/0158116 A1  6/2011  Tenny et al.
2012/0218988 A1  8/2012  Xu et al.
(Continued)

FOREIGN PATENT DOCUMENTS

CN    102014477 A    4/2011
CN    102281626 A    12/2011
(Continued)

OTHER PUBLICATIONS

Huawei, HiSilicon; "Discussion on timing advance for NTN"; 3GPP TSG RAN WG1 Meeting #96 Athens, Greece, Feb. 25-Mar. 1, 2019; R1-1903197 (Year: 2019).*
(Continued)

*Primary Examiner* — Gary Mui
(74) *Attorney, Agent, or Firm* — Slater Matsil, LLP

(57) ABSTRACT

An uplink synchronization method and an apparatus are provided. The method includes: sending, by a network device, a timing advance command to a communications device, where the timing advance command includes a timing advance TA reference value, and the TA reference value corresponds to a carrier in a timing advance group TAG; determining, by the communications device, a TA offset of the carrier based on carrier information of the carrier; and adjusting, by the communications device, an uplink transmission timing of the carrier based on the TA reference value and the TA offset of the carrier.

20 Claims, 9 Drawing Sheets

(56) References Cited

U.S. PATENT DOCUMENTS

| | | | |
|---|---|---|---|
| 2012/0282969 A1* | 11/2012 | Jiang | H04W 76/27 455/517 |
| 2012/0300715 A1* | 11/2012 | Pelletier | H04W 74/0891 370/329 |
| 2013/0188620 A1 | 7/2013 | Dinan | |
| 2015/0011215 A1 | 1/2015 | Uemura et al. | |
| 2015/0085839 A1 | 3/2015 | Bergstrom et al. | |
| 2017/0006641 A1* | 1/2017 | Dinan | H04W 74/0833 |
| 2017/0070985 A1 | 3/2017 | Uchino et al. | |
| 2017/0346685 A1 | 11/2017 | Wang et al. | |
| 2018/0035397 A1* | 2/2018 | Xie | H04W 56/0005 |
| 2019/0053316 A1* | 2/2019 | Aiba | H04W 72/0413 |
| 2019/0124615 A1 | 4/2019 | He | |
| 2019/0141697 A1* | 5/2019 | Islam | H04W 72/0453 |
| 2019/0159149 A1* | 5/2019 | Ryu | H04W 56/0045 |
| 2020/0008186 A1* | 1/2020 | Kim | H04W 56/0045 |
| 2020/0077451 A1* | 3/2020 | You | H04W 72/0453 |
| 2021/0212123 A1* | 7/2021 | Reial | H04B 7/0617 |

FOREIGN PATENT DOCUMENTS

| | | | |
|---|---|---|---|
| CN | 102461287 A | 5/2012 | |
| CN | 103906134 A | 7/2014 | |
| CN | 104272821 A | 1/2015 | |
| CN | 105493584 A | 4/2016 | |
| CN | 105790911 A | 7/2016 | |
| CN | 106165505 A | 11/2016 | |
| EP | 2848053 B1 | 4/2016 | |
| JP | 2012531121 A | 12/2012 | |
| JP | 2017511030 A | 4/2017 | |
| WO | 2013151651 A1 | 10/2013 | |
| WO | 2016017715 A1 | 2/2016 | |

OTHER PUBLICATIONS

3rd Generation Partnership Project; Technical Specification Group Radio Access Network; NR; Physical channels and modulation (Release 15), 3GPP TS 38.211 V15.0.0 (Dec. 2017), 73 pages.

3rd Generation Partnership Project; Technical Specification Group Radio Access Network; NR; Physical layer procedures for control (Release 15), 3GPP TS 38.213 V15.0.0 (Dec. 2017), 56 pages.

3rd Generation Partnership Project; Technical Specification Group Radio Access Network NR Radio Resource Control (RRC) protocol specification (Release 15), 3GPP TS 38.331 V15.0.0 (Dec. 2017), 188 pages.

* cited by examiner

UPLINK SYNCHRONIZATION METHOD, AND APPARATUS

CROSS-REFERENCE TO RELATED APPLICATIONS

This application is a continuation of International Application No. PCT/CN2019/074264, filed on Jan. 31, 2019, which claims priority to Chinese Patent Application No. 201810151028.3, filed on Feb. 13, 2018 and Chinese Patent Application No. 201810302366.2, filed on Apr. 4, 2018. The disclosures of the aforementioned applications are hereby incorporated by reference in their entireties.

TECHNICAL FIELD

This application relates to the field of information technologies, and in particular, to an uplink synchronization method and an apparatus.

BACKGROUND

In a wireless communications system, a signal is transmitted through an air interface path, and there is a delay before the signal arrives at a receive end. In the wireless communications system, a specified frame structure is used for transmission. For uplink (from a terminal to a network-side transmission point) transmission, a plurality of terminals have different transmission delays due to different paths during uplink transmission. To achieve a consistent timing relationship between a transmit end and a receive end to avoid interference between uplink transmission from different terminals in one cell, the transmit end needs to have a timing advance (TA). FIG. 1 is a schematic diagram of uplink synchronization. As shown in FIG. 1, to enable a base station to receive uplink transmission at a T0 moment, a terminal 1 needs to send uplink transmission according to a TA1, and a terminal 2 needs to send uplink transmission according to a TA2. In this way, the base station can receive both the uplink transmission from the terminal 1 and the uplink transmission from the terminal 2 at the T0 moment.

There is also a relationship between a TA and a duplex mode of a carrier. Using a long term evolution (LTE) system as an example, a TA offset (TA offset) is further configured for a time division duplex (TDD) carrier. In this case, for the TDD carrier, an absolute time of an uplink timing advance is a product of the uplink timing advance (namely, $N_{TA}+N_{TA\ offset}$) and a time granularity unit $T_s$. In other words, the uplink timing advance includes two parts: One part is a TA reference value $N_{TA}$, and the other part is the TA offset $N_{TA\ offset}$. In both LTE and NR, a plurality of timing advance groups (TAG) are supported. In LTE, TA reference values of carriers in each TAG are the same, and TA offsets of all the carriers in each TAG are also the same.

However, in an NR system, TA reference values of carriers in each TAG are the same, but carriers in one TAG may correspond to different TA offsets. Therefore, in the NR system, a problem of uplink out-of-synchronization between different terminals needs to be resolved when the carriers correspond to different TA offsets.

SUMMARY

In view of this, this application provides an uplink synchronization method and an apparatus, so as to resolve a problem of uplink out-of-synchronization between terminals in an NR system.

According to a first aspect, an embodiment of this application provides an uplink synchronization method. The method includes: receiving, by a communications device, a timing advance (TA) command sent by a network device, where the timing advance command includes a TA reference value, and the TA reference value corresponds to a carrier in a TAG; for any carrier in the TAG, determining, by the communications device, a TA offset of the carrier based on carrier information of the carrier; and adjusting an uplink transmission timing of the carrier based on the TA reference value and the TA offset of the carrier. In this case, when the TAG includes a plurality of carriers, the TA offset meets the following condition:

when the TAG is a first-type TAG, a difference between TA offsets of every two carriers in the TAG is a first difference; or when the TAG is a second-type TAG, a difference between TA offsets of every two carriers in the TAG is a second difference, where the first difference is the same as the second difference.

Generally, at least one carrier in the first-type TAG corresponds to a primary cell PCell or a primary secondary cell PSCell, and all carriers in the second-type TAG correspond to a secondary cell Scell. Because the first difference is the same as the second difference, it can be ensured that uplink transmission from the communications device on the TAG is synchronized with uplink transmission from another communications device, located in the same cell as the communications device, on another TAG, thereby avoiding signal interference caused by uplink out-of-synchronization in NR.

In a possible design, the communications device may first determine a maximum value of TA offsets of a plurality of carriers in the TAG, and then adjusts uplink transmission timings of the plurality of carriers in the TAG based on the TA reference value and a maximum TA offset. It can be learned that, the uplink transmission timing of each carrier in the TAG is adjusted by using the TA reference value and the maximum TA offset. Therefore, the first difference and the second difference are both 0, because this can ensure uplink synchronization with uplink transmission from another communications device, located in the same cell as the communications device, on another TAG.

In another possible design, the communications device may determine the TA offset of the carrier based on a frequency band of the carrier, where a TA offset determined when the frequency band of the carrier is less than a specified frequency value is greater than a TA offset determined when the frequency band of the carrier is greater than or equal to the specified frequency value. For example, using 6 GHz as a demarcation point, a TA offset of a carrier whose frequency band is less than 6 GHz is about 13 μs (which is equivalent to 25560 Tc), and a TA offset of a carrier whose frequency band is greater than or equal to 6 GHz is about 7 μs (which is equivalent to 13763 Tc).

In another possible design, the communications device may determine the TA offset of each carrier based on a subcarrier spacing of the carrier, where a TA offset determined when the subcarrier spacing of the carrier is less than a specified value is greater than a TA offset determined when the subcarrier spacing of the carrier is greater than or equal to the specified value. For example, carriers whose subcarrier spacings are 15 kHz, 30 kHz, and 60 kHz correspond to a same TA offset, and a carrier whose subcarrier spacing is 120 kHz and another carrier whose subcarrier spacing is greater than 120 kHz correspond to a same TA offset.

In another possible design, the corresponding TAG determined by a network side for the communications device may have the following features: The subcarrier spacing corresponding to the carrier in the TAG is less than or equal to 60 kHz, or the subcarrier spacing corresponding to the carrier in the TAG is greater than 60 kHz. In other words, generally, carriers whose subcarrier spacings are 15 kHz, 30 kHz, and 60 kHz correspond to a same TA offset, and a carrier whose subcarrier spacing is 120 kHz and another carrier whose subcarrier spacing is greater than or equal to 120 kHz correspond to a same TA offset. In this case, carriers in the TAG obtained in such a grouping manner usually correspond to a same TA offset, thereby avoiding a problem of uplink out-of-synchronization.

In addition, in still another possible design, in an NR system, even if the TAG configured by a network side for the communications device is the first-type TAG, the communications device may still set the TA offsets of carriers in the TAG to different values. For example, there are two carriers in the TAG, and a TA offset of a carrier A is configured without referring to a TA offset of a carrier B, or a TA offset of a carrier A is different from a TA offset of a carrier B. In this way, when the TAG is the first-type TAG, the first difference is still equal to the second difference, ensuring that uplink transmission from different communications devices in one cell on one carrier is synchronized.

It should be noted that, in the foregoing embodiment, different uplink synchronization manners may be combined. In other words, the communications device may determine, based on at least one of the foregoing conditions, to adjust uplink synchronization.

According to a second aspect, an embodiment of this application further provides an uplink synchronization method from a network side. The method includes: determining, by a network device, an uplink TA and a TA offset based on an uplink signal sent by a communications device, where a difference between the uplink TA and the TA offset is a TA reference value; determining, by the network device, the TA reference value based on the TA, where the TA reference value corresponds to a carrier in a timing advance group TAG; and sending, by the network device, a timing advance command to the communications device, where the timing advance command includes the TA reference value. In this way, the communications device can adjust an uplink timing based on the TA reference value and the TA offset that is determined by the communications device according to the same rule as the network side.

It should be noted that, when the TAG includes a plurality of carriers, the TA offset meets the following condition: when the TAG is a first-type TAG, a difference between TA offsets of every two carriers in the TAG is a first difference; or when the TAG is a second-type TAG, a difference between TA offsets of every two carriers in the TAG is a second difference, where the first difference is the same as the second difference, at least one carrier in the first-type TAG corresponds to a primary cell PCell or a primary secondary cell PSCell, and all carriers in the second-type TAG correspond to a secondary cell SCell.

In this way, because the first difference is the same as the second difference, it can be ensured that uplink transmission from the communications device on the TAG is synchronized with uplink transmission from another communications device, located in the same cell as the communications device, on another TAG, thereby avoiding signal interference caused by uplink out-of-synchronization in NR.

In a possible design, the network device determines the TA reference value based on the uplink timing advance and a maximum TA offset, where the maximum TA offset is a maximum value of TA offsets of the plurality of carriers in the TAG serving the communications device.

In a possible design, the network device may determine the TA offset of the carrier based on a frequency band of the carrier, where a TA offset determined when the frequency band of the carrier is less than a specified frequency value is greater than a TA offset determined when the frequency band of the carrier is greater than or equal to the specified frequency value. For example, using 6 GHz as a demarcation point, a TA offset of a carrier whose frequency band is less than 6 GHz is about 13 μs, and a TA offset of a carrier whose frequency band is greater than or equal to 6 GHz is about 7 μs.

In another possible design, the network device may determine the TA offset of each carrier based on a subcarrier spacing of the carrier, where a TA offset determined when the subcarrier spacing of the carrier is less than a specified value is greater than a TA offset determined when the subcarrier spacing of the carrier is greater than or equal to the specified value. For example, carriers whose subcarrier spacings are 15 kHz, 30 kHz, and 60 kHz correspond to a same TA offset, and a carrier whose subcarrier spacing is 120 kHz and another carrier whose subcarrier spacing is greater than 120 kHz correspond to a same TA offset.

In another possible design, the corresponding TAG determined by the network device for the communications device may have the following features: The subcarrier spacing corresponding to the carrier in the TAG is less than or equal to 60 kHz, or the subcarrier spacing corresponding to the carrier in the TAG is greater than 60 kHz. In other words, generally, carriers whose subcarrier spacings are 15 kHz, 30 kHz, and 60 kHz correspond to a same TA offset, and a carrier whose subcarrier spacing is 120 kHz and another carrier whose subcarrier spacing is greater than 120 kHz correspond to a same TA offset. In this case, carriers in the TAG obtained in such a grouping manner usually correspond to a same TA offset, thereby avoiding a problem of uplink out-of-synchronization.

In addition, in still another possible design, in an NR system, even if the TAG configured by the network device for the communications device is the first-type TAG, the communications device may still set the TA offsets of carriers in the TAG to different values. For example, there are two carriers in the TAG, and a TA offset of a carrier A is configured without referring to a TA offset of a carrier B, or a TA value of a carrier A is different from a TA offset of a carrier B. In this way, when the TAG is the first-type TAG, the first difference is still equal to the second difference, ensuring that uplink transmission from different communications devices in one cell on one carrier is synchronized.

It should be noted that, in the foregoing embodiment, different uplink synchronization manners may be combined. In other words, the network device may determine, based on at least one of the foregoing conditions, to adjust uplink synchronization.

According to a third aspect, an embodiment of this application further provides an apparatus. The apparatus has a function of implementing actions of the communications device in the embodiment in the first aspect. The function may be implemented by hardware, or may be implemented by hardware by executing corresponding software. The hardware or the software includes one or more modules corresponding to the foregoing function.

In a possible design, a structure of the apparatus includes a receiving unit and a processing unit. The receiving unit is configured to receive a timing advance command sent by a network device. The processing unit is configured to: determine a TA offset of a carrier based on carrier information of the carrier, and adjust an uplink transmission timing of the carrier based on a TA reference value and the TA offset of the carrier.

It should be noted that, when the TAG includes a plurality of carriers, the TA offset meets the following condition: when the TAG is a first-type TAG, a difference between TA offsets of every two carriers in the TAG is a first difference; or when the TAG is a second-type TAG, a difference between TA offsets of every two carriers in the TAG is a second difference, where the first difference is the same as the second difference, at least one carrier in the first-type TAG corresponds to a primary cell PCell or a primary secondary cell PSCell, and all carriers in the second-type TAG correspond to a secondary cell Scell.

In a possible design, when the TAG includes a plurality of carriers, the processing unit is specifically configured to: adjust uplink transmission timings of the plurality of carriers in the TAG based on the TA reference value and a maximum TA offset, where the maximum TA offset is a maximum value of TA offsets of the plurality of carriers.

In another possible design, the processing unit is specifically configured to determine the TA offset of the carrier based on a frequency band of the carrier, where a TA offset determined when the frequency band of the carrier is less than a specified frequency value is greater than a TA offset determined when the frequency band of the carrier is greater than or equal to the specified frequency value.

In a third possible design, the processing unit is specifically configured to determine the TA offset of each carrier based on a subcarrier spacing of the carrier, where a TA offset determined when the subcarrier spacing of the carrier is less than a specified value is greater than a TA offset determined when the subcarrier spacing of the carrier is greater than or equal to the specified value.

In a possible implementation, the subcarrier spacing corresponding to the carrier in the TAG is less than or equal to 60 kHz, or the subcarrier spacing corresponding to the carrier in the TAG is greater than 60 kHz. Alternatively, in a possible implementation, the TA offsets of all the carriers in the TAG are set separately.

In this embodiment of this application these units may perform corresponding functions in the embodiment in the first aspect. For details, refer to the detailed descriptions in the embodiment. Details are not repeated herein.

In another possible design, when the apparatus is a chip in the communications device, the chip includes a processing unit and a communications unit. The processing unit may be, for example, a processor. The communications unit may be, for example, an input/output interface, a pin, or a circuit. The processing unit may execute a computer executable instruction stored in a storage unit, so that the uplink synchronization transmission method in any one of the first aspect or the possible designs is performed. Optionally, the storage unit is a storage unit in the chip, such as a register or a cache, or the storage unit may be a storage unit located in the communications device but outside the chip, such as a read-only memory, another type of static storage device that can store static information and an instruction, or a random access memory.

According to a fourth aspect, an embodiment of this application further provides an apparatus. The apparatus has a function of implementing actions of the network device in the embodiment in the second aspect. The function may be implemented by hardware, or may be implemented by hardware by executing corresponding software. The hardware or the software includes one or more modules corresponding to the foregoing function.

In a possible design, a structure of the apparatus includes a processing unit and a sending unit. The processing unit is configured to: determine an uplink timing advance and a TA offset based on an uplink signal sent by a communications device, and determine a TA reference value based on the uplink timing advance, where the TA reference value corresponds to a carrier in a timing advance group TAG, and the TA reference value is a difference between the uplink timing advance and the TA offset. The sending unit is configured to send a timing advance command to the communications device, where the timing advance command includes the TA reference value.

It should be noted that, when the TAG includes a plurality of carriers, the TA offset meets the following condition: when the TAG is a first-type TAG, a difference between TA offsets of every two carriers in the TAG is a first difference; or when the TAG is a second-type TAG, a difference between TA offsets of every two carriers in the TAG is a second difference, where the first difference is the same as the second difference, at least one carrier in the first-type TAG corresponds to a primary serving cell PCell or a primary secondary serving cell PSCell, and all carriers in the second-type TAG correspond to a secondary serving cell SCell.

In a possible design, the processing unit is specifically configured to: determine the TA reference value based on the uplink timing advance and a maximum TA offset, where the maximum TA offset is a maximum value of TA offsets of the plurality of carriers in the TAG serving the communications device.

In another possible design, the processing unit is specifically configured to determine the TA offset of the carrier based on a frequency band of the carrier, where a TA offset determined when the frequency band of the carrier is less than a specified frequency value is greater than a TA offset determined when the frequency band of the carrier is greater than or equal to the specified frequency value.

In another possible design, the processing unit is specifically configured to determine the TA offset of each carrier based on a subcarrier spacing of the carrier, where a TA offset determined when the subcarrier spacing of the carrier is less than a specified value is greater than a TA offset determined when the subcarrier spacing of the carrier is greater than or equal to the specified value.

In a possible implementation, the subcarrier spacing corresponding to the carrier in the TAG is less than or equal to 60 kHz, or the subcarrier spacing corresponding to the carrier in the TAG is greater than 60 kHz. Alternatively, in a possible implementation, the TA offsets of all the carriers in the TAG are set separately.

In this embodiment of this application, these units may perform corresponding functions in the embodiment in the second aspect. For details, refer to the detailed descriptions in the embodiment. Details are not repeated herein.

In another possible design, when the apparatus is a chip in the network device, the chip includes a processing unit and a communications unit. The processing unit may be, for example, a processor. The communications unit may be, for example, an input/output interface, a pin, or a circuit. The processing unit may execute a computer executable instruction stored in a storage unit, so that the uplink synchronization transmission method in any one of the first aspect or the possible designs is performed. Optionally, the storage unit is a storage unit in the chip, such as a register or a cache, or the storage unit may be a storage unit located in the network device but outside the chip, such as a read-only memory, another type of static storage device that can store static information and an instruction, or a random access memory.

According to a fifth aspect, an embodiment of this application provides an uplink synchronization method. The method includes: requesting, by a first network device, to obtain a second TA reference value and a second TA offset of a second uplink carrier in a second TAG from a second network device; and determining, by the first network device, a first TA reference value of a first uplink carrier in a first TAG based on the second TA reference value and the second TA offset. The first TAG corresponds to the first network device of a first communications standard, and the second TAG corresponds to the second network device of a second communications standard. Therefore, the first TA reference value determined by the first network device is greater than or equal to a difference between the second TA offset and a first TA offset of the first uplink carrier. In this way, after the first network device sends a timing advance command including the first TA reference value to a communications device, the communications device can adjust an uplink transmission timing of the first uplink carrier based on the first TA reference value and the first TA offset.

In a possible design, when the first communications standard is LTE, the second communications standard is NR, the first uplink carrier is an LTE UL carrier, and the second uplink carrier is an NR SUL carrier, the second TA offset of the second uplink carrier is determined based on a TA offset of an NR UL carrier that corresponds to the same serving cell as the second uplink carrier.

In another possible design, when the first communications standard is NR, the second communications standard is LTE, the first uplink carrier is an NR SUL carrier, and the second uplink carrier is an LTE UL carrier, the second TA offset of the second uplink carrier is determined based on a TA offset of a TDD carrier that belongs to the same TAG as the second uplink carrier.

According to a sixth aspect, an embodiment of this application provides an uplink synchronization method. The method includes: receiving, by a communications device, a timing advance command sent by a first network device, where the timing advance command includes a first timing advance TA reference value, the first TA reference value corresponds to a first uplink carrier in a first timing advance group TAG, the first TA reference value is determined based on a second TA reference value and a second TA offset of a second uplink carrier, the first TAG corresponds to the first network device of a first communications standard, and a second TAG corresponds to a second network device of a second communications standard; and adjusting, by the communications device, an uplink transmission timing of the first uplink carrier based on the first TA reference value.

In a possible design, when the first communications standard is LTE, the second communications standard is NR, the first uplink carrier is an LTE UL carrier, and the second uplink carrier is an NR SUL carrier, the second TA offset of the second uplink carrier is determined based on a TA offset of an NR UL carrier that corresponds to the same serving cell as the second uplink carrier.

In another possible design, when the first communications standard is NR, the second communications standard is LTE, the first uplink carrier is an NR SUL carrier, and the second uplink carrier is an LTE UL carrier, the second TA offset of the second uplink carrier is determined based on a TA offset of a TDD carrier that belongs to the same TAG as the second uplink carrier.

According to a seventh aspect, an embodiment of this application further provides an apparatus. The apparatus has a function of implementing actions of the first network device in the embodiment in the fifth aspect. The function may be implemented by hardware, or may be implemented by hardware by executing corresponding software. The hardware or the software includes one or more modules corresponding to the foregoing function.

In a possible design, a structure of the apparatus includes a sending unit and a processing unit. The sending unit is configured to send a request to a second network device, where the sent request is used to request to obtain a second TA reference value and a second TA offset of a second uplink carrier in a second TAG, and the second TAG corresponds to the second network device of a second communications standard. The processing unit is configured to determine a first TA reference value of a first uplink carrier in a first TAG based on the second TA reference value and the second TA offset, where the first TAG corresponds to a first network device of a first communications standard. The sending unit is further configured to send a timing advance command including the first TA reference value to a communications device.

Therefore, the first TA reference value determined by the processing unit is greater than or equal to a difference between the second TA offset and a first TA offset of the first uplink carrier. In this way, after the first network device corresponding to the processing unit sends the timing advance command including the first TA reference value to the communications device, the communications device can adjust an uplink transmission timing of the first uplink carrier based on the first TA reference value and the first TA offset.

In a possible design, when the first communications standard is LTE, the second communications standard is NR, the first uplink carrier is an LTE UL carrier, and the second uplink carrier is an NR SUL carrier, the second TA offset of the second uplink carrier is determined based on a TA offset of an NR UL carrier that corresponds to the same serving cell as the second uplink carrier.

In another possible design, when the first communications standard is NR, the second communications standard is LTE, the first uplink carrier is an NR SUL carrier, and the second uplink carrier is an LTE UL carrier, the second TA offset of the second uplink carrier is determined based on a TA offset of a TDD carrier that belongs to the same TAG as the second uplink carrier.

According to an eighth aspect, an embodiment of this application further provides an apparatus. The apparatus has a function of implementing actions of the communications device in the embodiment in the sixth aspect. The function may be implemented by hardware, or may be implemented by hardware by executing corresponding software. The hardware or the software includes one or more modules corresponding to the foregoing function.

In a possible design, a structure of the apparatus includes a receiving unit and a processing unit. The receiving unit is configured to receive a timing advance command sent by a first network device, where the timing advance command includes a first timing advance TA reference value, the first TA reference value corresponds to a first uplink carrier in a first timing advance group TAG, the first TA reference value is determined based on a second TA reference value and a second TA offset of a second uplink carrier, the first TAG corresponds to the first network device of a first communications standard, and a second TAG corresponds to a second network device of a second communications standard. The processing unit is configured to adjust an uplink transmission timing of the first uplink carrier based on the first TA reference value.

Therefore, the first TA reference value determined by the first network device is greater than or equal to a difference between the second TA offset and a first TA offset of the first uplink carrier. In this way, after the first network device sends the timing advance command including the first TA reference value to the communications device, the communications device can adjust the uplink transmission timing of the first uplink carrier based on the first TA reference value and the first TA offset.

In a possible design, when the first communications standard is LTE, the second communications standard is NR, the first uplink carrier is an LTE UL carrier, and the second uplink carrier is an NR SUL carrier, the second TA offset of the second uplink carrier is determined based on a TA offset of an NR UL carrier that corresponds to the same serving cell as the second uplink carrier.

In another possible design, when the first communications standard is NR, the second communications standard is LTE, the first uplink carrier is an NR SUL carrier, and the second uplink carrier is an LTE UL carrier, the second TA offset of the second uplink carrier is determined based on a TA offset of a TDD carrier that belongs to the same TAG as the second uplink carrier.

According to a ninth aspect, an embodiment of this application provides an apparatus, including at least one processor and at least one memory. The processor is configured to perform the uplink synchronization method in any one of the first aspect, the second aspect, or the possible designs of the first aspect and the second aspect. The memory is coupled to the processor.

According to a tenth aspect, an embodiment of this application provides an apparatus, including at least one processor and at least one memory. The at least one memory is coupled to the at least one processor, and the at least one memory is configured to store computer program code, where the computer program code includes a computer instruction, and when the one or more processors execute the computer instruction, the apparatus performs the uplink synchronization method in any one of the first aspect, the second aspect, or the possible designs of the first aspect and the second aspect, or the uplink synchronization method in any one of the fifth aspect, the second aspect, or the possible designs of the fifth aspect and the sixth aspect.

According to an eleventh aspect, an embodiment of this application provides an apparatus, including at least one processor. The processor is configured to perform the uplink synchronization method in any one of the first aspect, the second aspect, or the possible designs of the first aspect and the second aspect, or the uplink synchronization method in any one of the fifth aspect, the sixth aspect, or the possible designs of the fifth aspect and the sixth aspect.

According to a twelfth aspect, an embodiment of this application provides a chip. The chip exists in a form of an apparatus, and the chip may be any apparatus in the foregoing aspects.

The uplink synchronization methods provided in the embodiments of this application are applicable to an NR system. This is because when different carriers on which carrier aggregation is performed in the NR system correspond to a plurality of different TA offsets, uplink transmission from different users on one carrier may be not synchronized. According to the embodiments of this application, the TA offset of each carrier in the TAG is determined based on the carrier information of the carrier in the TAG, and the uplink transmission timing of each carrier in the TAG is adjusted based on the TA reference value and the TA offset of the carrier in the TAG. In addition, when the TAG is the first-type TAG, the difference between the TA offsets of every two carriers in the TAG is the first difference, or when the TAG is the second-type TAG, the difference between the TA offsets of every two carriers in the TAG is the second difference, where the first difference is the same as the second difference. Because the first difference is the same as the second difference, it can be ensured that uplink transmission from the communications device on the TAG is synchronized with uplink transmission from another communications device, located in the same cell as the communications device, on another TAG, thereby avoiding signal interference caused by uplink out-of-synchronization in NR.

In addition, the uplink synchronization methods provided in the embodiments of this application are applicable to a dual-connectivity system. In the dual-connectivity system, network devices of different communications standards can interact with each other. Therefore, an LTE base station can determine a TA reference value of an LTE uplink carrier based on a TA reference value and a TA offset of an NR base station; or an NR base station can determine a TA reference value of an NR uplink carrier based on a TA reference value and a TA offset of an LTE base station. Because the TA reference value received by the communications device meets a specified condition, uplink synchronization is implemented, thereby avoiding signal interference caused by uplink out-of-synchronization.

DETAILED DESCRIPTION OF ILLUSTRATIVE EMBODIMENTS

The following further describes this application in detail with reference to accompanying drawings.

The embodiments of this application may be applied to existing cellular communications systems, such as a global system for mobile communications (GSM), a wideband code division multiple access (WCDMA) system, and a long term evolution (LTE) system. The embodiments of this application are also applicable to future communications systems, for example, 5G (5th generation mobile communications) systems, such as communications systems using an NR access network, a cloud radio access network (CRAN), and the like, and may also be extended to similar wireless communications systems, such as a wireless fidelity (Wi-Fi) system, a worldwide interoperability for microwave access (WiMAX), and cellular systems related to the 3GPP access.

Figure 1:
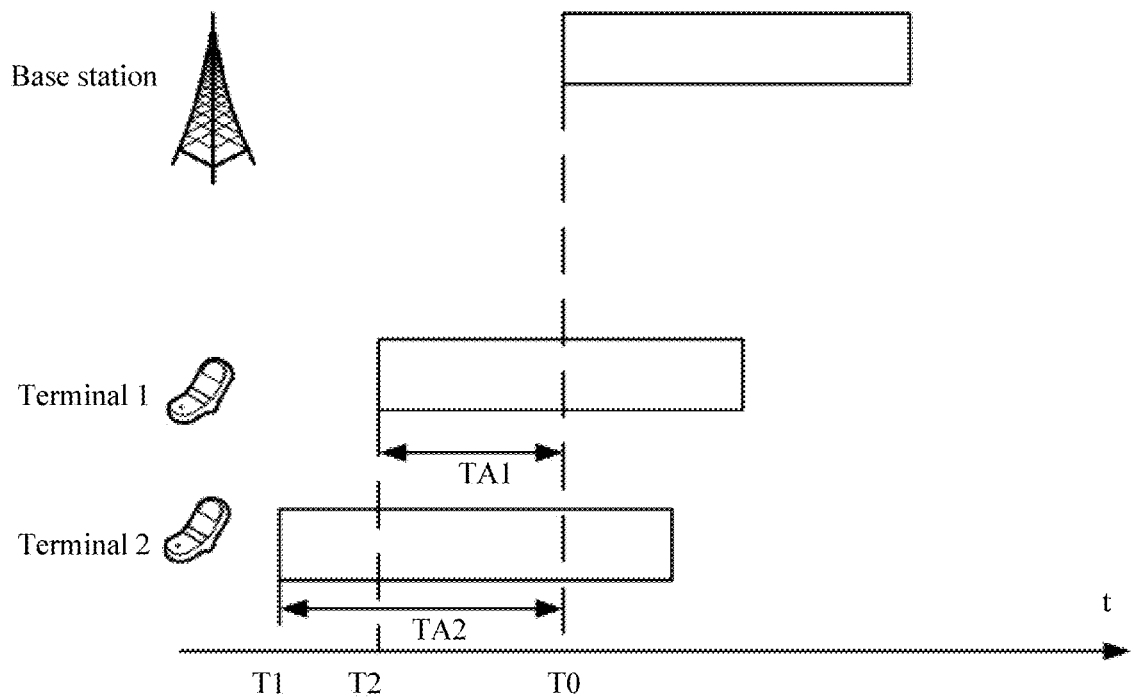
FIG. 1 is a schematic diagram of uplink synchronization in the prior art.
Figure 2:
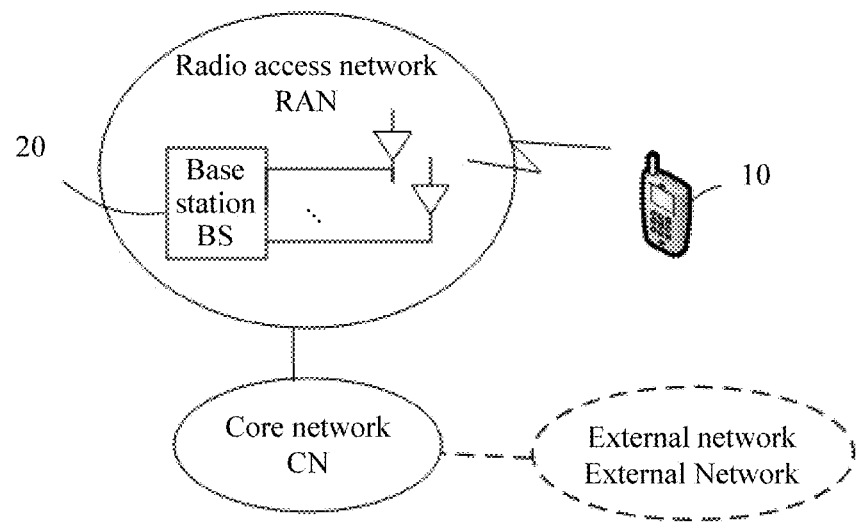
FIG. 2 is an architectural flowchart of a communications system according to an embodiment of this application.

FIG. 2 is a schematic diagram of an application scenario to which this application is applicable. Network architectures and service scenarios that are described in the embodiments of the present invention are used to describe the technical solutions in the embodiments of the present invention more clearly, but do not limit the technical solutions provided in the embodiments of the present invention. A person of ordinary skill in the art may know that the technical solutions provided in the embodiments of the present invention are also applicable to similar technical problems as the network architectures evolve and a new service scenario appears.

FIG. 2 is a schematic diagram of a possible application scenario in the present invention. In the application scenario, at least one terminal 10 communicates with a radio access network (RAN). The RAN includes at least one base station 20 (BS). For clarity, only one base station and one UE are shown in the figure. The RAN is connected to a core network (CN). Optionally, the CN may be coupled to one or more external networks, such as the internet and a public switched telephone network (PSTN).

For ease of understanding, the following describes some nouns used in this application.

(1) A communications device is also referred to as a terminal, user equipment (UE), or a device that provides voice and/or data connectivity for a user, for example, a handheld device or a vehicle-mounted device with a wireless connection function. A common terminal includes, for example, a mobile phone, a tablet computer, a notebook computer, a palmtop computer, a mobile internet device (MID), or a wearable device such as a smartwatch, a smart band, and a pedometer. The communications device may be implemented by using a chip. In the following, for ease of description, the communications devices are collectively referred to as UE.

(2) A network device may be, for example, a base station. The base station is also referred to as a radio access network (RAN) device, and is a device that connects a terminal to a wireless network, including but not limited to an evolved NodeB (eNB), a radio network controller (RNC), a NodeB (NB), a base station controller (BSC), a base transceiver station (BTS), a home base station (for example, a Home evolved NodeB or a Home NodeB, HNB for short), a baseband unit (BBU), a gNodeB (gNB), a transmission and reception point (TRP), and a transmission point (TP). In addition, the base station may further include a Wi-Fi access point (AP) and the like. In the following, for ease of description, the network devices are collectively referred to as a base station.

In LTE, a TA reference value and a TA offset are defined as follows: The $i^{th}$ uplink radio frame in which UE sends uplink transmission should be $(N_{TA}+N_{TAoffset}) \times T_s$ seconds ahead of a corresponding downlink radio frame for the UE. If an SCG is configured for the UE, $0 \leq N_{TA} \leq 4096$; or if no SCG is configured for the UE, $0 \leq N_{TA} \leq 20512$. For an FDD frame structure type, $N_{TAoffset}=0$; for a TDD frame structure type, $N_{TAoffset}=624$.

In other words, the UE needs to determine, based on $N_{TA}$ and $N_{TAoffset}$, a time at which an uplink signal is sent. Specifically, an absolute time of an uplink timing advance is equal to a product of the uplink timing advance (namely, $N_{TA}+N_{TA\ offset}$ in the formula) and a time granularity unit $T_s$. The uplink timing advance adjustment value includes two parts: One part is $N_{TA}$, that is, the TA reference value mentioned in the embodiments of this application; and the other part is $N_{TAoffset}$, that is, the TA offset mentioned in the embodiments of this application.

A definition similar to that in LTE also exists in a current NR protocol. To be specific, the $i^{th}$ uplink radio frame in which UE sends uplink transmission should be $(N_{TA}+N_{TAoffset}) \times T_c$ seconds ahead of a corresponding downlink radio frame for the UE.

It can be seen that a main difference is that the time granularity unit $T_c$ of the timing advance in NR is different from $T_s$ in LTE. The time granularity unit in LTE is defined as $T_s=1/2048/15000$ second, while the time granularity in NR is defined as $T_c=1/4096/480000$ second. Although the time units are defined differently, in LTE and NR, the uplink timing advance adjustment values have same parts: the TA reference value $N_{TA}$ and the TA offset $N_{TAoffset}$.

In addition, in both LTE and NR, a plurality of TAGs are supported, all carriers in each TAG correspond to a same TA reference value, and all the carriers in each TAG correspond to a same uplink timing advance adjustment value. Based on the compositions and definitions of the timing advance adjustment value, in LTE and NR carrier aggregation scenarios, whether the TA offset $N_{TAoffset}$ is used for each carrier or which TA offset is used for each carrier also depends on carrier information.

In LTE, for a TAG including a primary cell (PCell) or a primary secondary cell (PSCell), when timing advance adjustment is performed, a TA offset $N_{TAoffset}$ corresponding to the PCell or the PSCell is used for all carriers in the TAG, to calculate a timing advance adjustment value. Herein, a TA offset $N_{TAoffset}$ corresponding to a primary component carrier is a TA offset $N_{TAoffset}$ used for the PCell or the PSCell when the PCell or the PSCell operates in a single-carrier mode. For a TAG excluding a PCell or a PSCell, if all cells in the TAG use a same duplex mode, that is, all carriers in the TAG are TDD carriers, or all carriers in the TAG are FDD carriers, a TA offset $N_{TAoffset}=0$ is used for all the carriers in the group, to calculate a timing advance adjustment value. For a TAG excluding a PCell or a PSCell, if cells in the TAG use two duplex modes, and the TAG includes both an FDD cell and a TDD cell, a TA offset $N_{TAoffset}=624$ is used for all carriers in the TAG, to calculate a timing advance adjustment value. From the perspective of an entire mechanism, the mechanism ensures that for any UE, uplink transmission on different uplink carriers in any TAG is synchronized. Synchronization herein specifically means that for time-aligned subframes corresponding to two carriers, uplink subframes corresponding to one carrier have the same time points as those corresponding to the other carrier.

However, in an NR system, there may be a plurality of different TA offsets. If the foregoing mechanism in LTE is still used, a problem may occur. A main reason is as follows: For the TAG excluding the PCell or the PSCell, when the TAG includes both the TDD cell and the FDD cell, a TA offset of a TDD carrier is used in LTE. However, in NR, different TDD carriers may correspond to different TA offsets. Therefore, the UE does not know how to select a TA offset. As a result, using the TA offset adjustment mechanism in LTE cannot ensure that all carriers in each TAG correspond to a same TA offset, and uplink signals from different users on one carrier may not be synchronized.

It should be pointed out that, in LTE and NR, a cell is a higher-layer concept, and a carrier is a physical-layer concept. There is a correspondence between the cell and the carrier. For example, in LTE, one cell may be configured to include one pair of uplink and downlink carriers or only one downlink carrier. In NR, one cell may be configured to include one pair of uplink and downlink carriers, or only one downlink carrier, or one downlink carrier, one uplink carrier, and one supplementary uplink carrier (SUL) carrier. Due to the correspondence between the carrier and the cell, one carrier corresponds to only one cell, and the corresponding carrier can be found once the cell is configured, or the corresponding cell can be found once the carrier is configured. Therefore, the cell and the carrier are not strictly distinguished from each other in the present invention, and may be used interchangeably in a case of no confusion.

The embodiments provided in this application are used to implement uplink synchronization. Distances between different UEs and a base station are undetermined, and uplink transmission from different UEs in one cell needs to be aligned in time. Otherwise, uplink transmission from different terminals in one cell interferes with each other. Currently, the UEs may establish uplink synchronization with the base station by using a random access procedure. The base station detects that the UEs have sent preamble (preamble) signals, estimates a TA reference value by using the received preamble signals, and sends the TA reference value to the UEs by using a random access response; and the UEs calculate TAs after receiving the random access response, so that uplink signals sent by the different UEs in one cell on one carrier simultaneously arrive at the base station. After establishing RRC connection, the UEs may further track and adjust synchronization within a small area by measuring and tracking a pilot signal sent by the base station; and the base station may also estimate and adjust the timing advances of the UEs by measuring uplink signals from the UEs, and notify the UEs of the timing advances by using a TAC. When considering that the UEs may be out of synchronization, the base station may trigger the UEs to send preamble signals, so as to measure and adjust the timing advances. Therefore, significance of uplink synchronization is to ensure that a difference between delays before uplink signals from a plurality of UEs on one carrier arrive at the base station falls within a specific range, so that the uplink signals from the plurality of UEs do not severely interfere with each other and correct reception of the plurality of uplink signals by the base station is not affected. A technical nature of the uplink timing advance is that the UE compensates for a spatial transmission delay of a sent signal in advance by using the timing advance.

The embodiments provided in this application are applicable to a carrier aggregation scenario. Through carrier aggregation, at least two component carriers CC) are aggregated together to support a larger transmission bandwidth. The component carrier may also be referred to as a carrier. For example, cells in carrier aggregation may include a primary cell (PrimaryCell, PCell) and a secondary cell (SecondaryCell, SCell). Specifically, the PCell may be a cell in which a terminal communicates with a base station during initial connection establishment, a cell on which an RRC connection or reconfiguration is performed, or a cell that is determined by a base station or a terminal in a handover process and that is mainly used to implement RRC communication between the base station and the terminal. The SCell may be a cell that is added by a base station during RRC reconfiguration to serve a terminal. For example, RRC communication may not be implemented between the SCell and the terminal. A primary component carrier (PCC) is a CC corresponding to the PCell, and a secondary component carrier (SCC) is a CC corresponding to the SCell.

In the carrier aggregation scenario, when a plurality of uplink carriers are configured for UE, because the plurality of uplink carriers may not be co-sited at a network side, beam directions of different carriers are different, or the like, timing advances for transmission from the UE on the different uplink carriers may be different. Therefore, different carriers are classified into different timing advance groups (TAG), all carriers in one TAG correspond to a same TA reference value, and different TAGs correspond to different TA reference values. If a TAG includes a PCell or a PSCell, the TAG is referred to as a pTAG in the embodiments of this application. If a TAG does not include any PCell or PSCell, that is, the TAG includes only an SCell, the TAG is referred to as an sTAG in the embodiments of this application.

In addition, there is also a relationship between a timing advance and a duplex mode of a carrier.

For a frequency division duplex (FDD) carrier, because carrier frequencies for an uplink signal and a downlink signal are different, and both an uplink and a downlink are always present, no uplink-downlink switching is required. To be specific, a start point of a downlink frame/slot sent by a base station side may be the same as a start point of an uplink frame/slot received by the base station side, or a downlink frame/slot boundary at a base station side may be aligned with an uplink frame/slot boundary at the base station side. Therefore, an actual uplink timing advance of uplink transmission sent by the UE is equal to a TA reference value in a TAC.

For a time division duplex (TDD) carrier, different slots are occupied for uplink and downlink. Therefore, when a transmission direction between a base station and UE changes, that is, when the transmission direction changes from uplink transmission to downlink transmission, or from downlink transmission to uplink transmission, a period of time is required to perform switching. Therefore, for a TDD system, to ensure a sufficient switching time for the uplink, a sufficient guard interval needs to be reserved during switching. Strictly, the guard interval includes two pails: One part is a time for switching from the uplink to the downlink, and the other part is a time for switching from the downlink to the uplink. The guard interval needs to include the two parts, and the latter part is closely related to a TA offset. Therefore, when the transmission direction changes from uplink transmission to downlink transmission, the UE needs to adjust the TA based on a TA reference value. The actually adjusted TA is equal to a sum of the TA reference value and the TA offset. In this way, after the UE completes uplink transmission, both the UE and the base station have sufficient time to complete switching, the base station can normally send a downlink signal after switching, and the UE can normally receive the downlink signal after switching. Therefore, for the TDD carrier, the uplink timing advance of the UE is equal to a sum of the TA reference value in the TAC and the TA offset.

In LTE, because carriers in each TAG correspond to a same TA reference value, and all the carriers in each TAG also correspond to a same TA offset, all the carriers in the TAG also correspond to a same actual TA adjustment value (a sum of the TA reference value and the TA offset). In this way, an appropriate TA reference value may be configured for different users, so that uplink signals from different UEs on each carrier are synchronized. However, in the NR system, if the TA adjustment mechanism in LTE is fully followed, because there may be a plurality of different TA offsets, all carriers in each TAG may correspond to different uplink timing advances. When different carriers correspond to different TA offsets, if all the carriers in the TAG correspond to different actual TA adjustment values, uplink signals from different users on one carrier may be not synchronized.

For example, for user equipments UE1 and UE2 that are served in one site, carrier aggregation is configured for both the UE1 and the UE2, and both the UE1 and the UE2 are served by a cell 1, a cell 2, and a cell 3 that are co-sited. The cell 1, the cell 2, and the cell 3 each correspond to an uplink carrier. Assuming that the cell 1, the cell 2, and the cell 3 each correspond to one uplink carrier, the uplink carriers corresponding to the cell 1, the cell 2, and the cell 3 are a carrier CC1, a carrier CC2, and a carrier CC3, respectively. It is assumed that the cell 1 is a primary serving cell of the UE1, and the cell 2 and the cell 3 are secondary serving cells of the UE1; and that the cell 1, the cell 2, and the cell 3 all are secondary serving cells of the UE2. For the UE1 and the UE2, the carrier CC1, the carrier CC2, and the carrier CC3 are aggregated together to support a larger transmission bandwidth. The three carriers are classified by a network side based on a co-site relationship, and a TAG is configured for each of the UE1 and the UE2. For the UE1, because the cell 1 is the primary serving cell of the UE1, the UE1 corresponds to a pTAG. Similarly, because the cell 1, the cell 2, and the cell 3 all are the secondary serving cells of the UE2, the UE2 corresponds to an sTAG. It is assumed that both the cell 1 and the cell 2 use a TDD mode, and the cell 3 uses an FDD mode. A TDD carrier needs to be adjusted based on a TA reference value. Therefore, there is a TA offset. It is known that, as listed in Table 1, a TA reference value configured by a base station for the pTAG is 1 μs, a TA offset1 corresponding to the cell 1 is 0.1 μs, a TA offset2 corresponding to the cell 2 is 0.2 μs, and a TA offset3 corresponding to the cell 3 is 0.0 μs; and a TA reference value configured by the base station for the sTAG is 0.6 μs, a TA offset1 corresponding to the cell 1 is 0.05 μs, a TA offset2 corresponding to the cell 2 is 0.2 μs, and a TA offset3 corresponding to the cell 3 is 0.0 μs.

As stipulated in an LTE protocol, the communications device adjusts an uplink transmission timing of each carrier in a TAG based on a TA offset of a primary component carrier and a TA reference value. Therefore, in the pTAG, a TA offset actually used for each carrier is the same as the TA offset of the primary component carrier. Assuming that the primary component carrier is the carrier CC1, an actually used value of the TA offset2 of the carrier CC2 is 0.1 μs, and an actually used value of the TA offset3 of the carrier CC3 is 0.1 μs. In other words, an actual TA value of the carrier CC1 is 1.1 μs, an actual TA adjustment value of the carrier CC2 is 1.1 μs, and an actual TA adjustment value of the carrier CC3 is 1.1 μs.

Because a macro base station and a small cell share the carrier CC1, the carrier CC2, and the carrier CC3, in the sTAG, the carrier CC1 and the carrier CC2 also use the TDD mode, and the carrier CC3 also uses the FDD mode. It is known that, in the sTAG, the TA reference values are all 0.6 μs, and the TA offsets of the carrier CC1 and the carrier CC2 correspond to different values. As listed in Table 2, a TA offsets of the carrier CC1 is 0.05 μs, and a TA offset2 of the carrier CC2 is 0.2 μs. In other words, an actual TA adjustment value of the carrier CC1 is 0.65 μs, and an actual TA adjustment value of the carrier CC2 is 0.8 μs. Because the carrier CC3 uses the FDD mode, an actual TA adjustment value of the carrier CC3 is equal to the TA reference value, that is, 0.6 μs.

TABLE 1 pTAG

| | | | |
|---|---|---|---|
| Carrier CC1 (TDD) | TA reference value = 1 μs | TA offset1 = 0.1 μs | Actual TA adjustment value 1 = 1.1 μs |
| Carrier CC2 (TDD) | TA reference value = 1 μs | TA offset2 = 0.2 μs –> 0.1 μs | Actual TA adjustment value 2 = 1.1 μs |
| Carrier CC3 (FDD) | TA reference value = 1 μs | TA offset3 = 0.0 μs –> 0.1 μs | Actual TA adjustment value 3 = 1.1 μs |

TABLE 2 sTAG

| | | | |
|---|---|---|---|
| Carrier CC1 (TDD) | TA reference value = 0.6 μs | TA offset1 = 0.05 μs | Actual TA adjustment value 1 = 0.65 μs |
| Carrier CC2 (TDD) | TA reference value = 0.6 μs | TA offset2 = 0.2 μs | Actual TA adjustment value 2 = 0.8 μs |
| Carrier CC3 (FDD) | TA reference value = 0.6 μs | TA offset3 = 0.0 μs | Actual TA adjustment value 3 = 0.6 μs |

In this way, because the actual TA adjustment values of the carrier CC1 and the carrier CC2 are the same, that is, both are 1.1 μs, uplink transmission sent by the UE1 on the carrier CC1 and uplink transmission sent by the UE1 on the carrier CC2 can simultaneously arrive at the macro base station. However, in this case, in the sTAG, the actual TA adjustment value of the carrier CC1 is 0.65 μs, and the actual TA adjustment value of the carrier CC2 is 0.8 μs. If uplink transmission sent by the UE2 on the carrier CC1 also arrives at the macro base station at the same time as the UE1, an uplink signal sent by the UE2 on the carrier CC2 arrives at the macro base station 0.15 μs ahead of time. Obviously, uplink transmission sent by the UE1 and uplink transmission sent by the UE2 on the carrier CC2 are not synchronized.

In other words, a difference between the actual TA adjustment value 1.1 μs of the carrier CC1 for the UE1 and the actual TA adjustment value 1.1 μs of the carrier CC2 for the UE1 is 0 μs, and a difference between the actual TA adjustment value 0.65 μs of the carrier CC1 for the UE2 and the actual TA adjustment value 0.8 μs of the carrier CC2 for the UE2 is −0.15 μs. Uplink synchronization requires uplink signals from different UEs on one CC to simultaneously arrive at the macro base station, and the difference o is not equal to the difference −0.15 μs. In this case, if the UE1 and the UE2 implement uplink synchronization on the CC1, the UE1 and the UE2 do not implement uplink synchronization on the carrier CC2.

Therefore, when different carriers on which carrier aggregation is performed in the NR system correspond to a plurality of different TA offsets, uplink transmission from different users on one carrier may be not synchronized.

Figure 4:
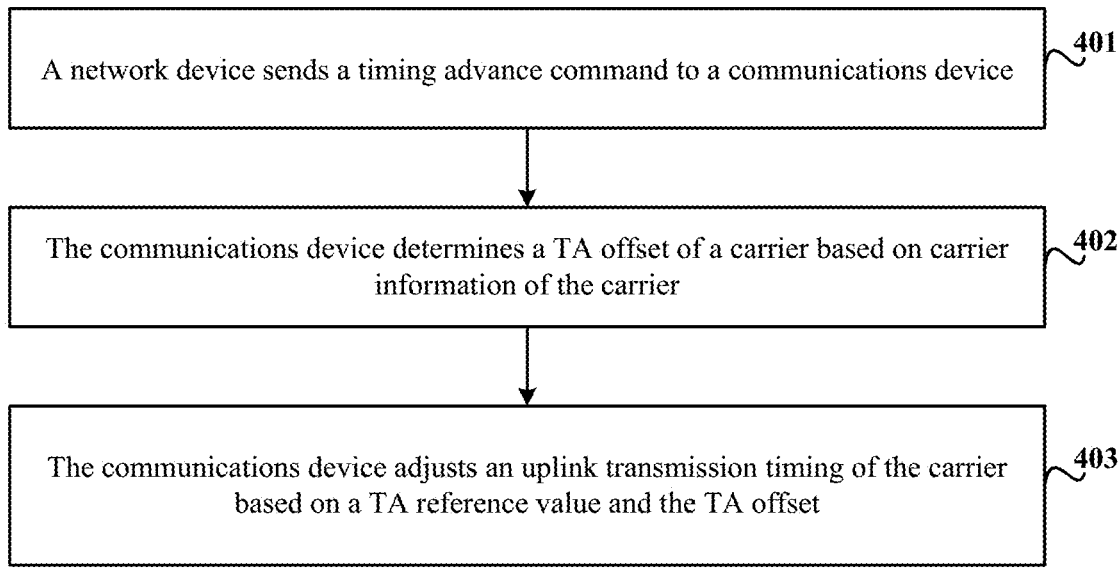
FIG. 4 is a schematic flowchart of an uplink synchronization method performed by a communications device according to an embodiment of this application.

To resolve the foregoing problem, an embodiment of this application provides an uplink synchronization method. A schematic flowchart is shown in FIG. 4.

Step 401: A network device sends a timing advance command to a communications device, where the timing advance command includes a TA reference value, and the TA reference value corresponds to a carrier in a TAG.

Step 402: The communications device determines a TA offset of the carrier based on carrier information of the carrier.

Step 403: The communications device adjusts an uplink transmission timing of each carrier in the TAG based on the TA reference value and the TA offset.

Specifically, in step 402, the TA offset of each carrier in the TAG that is determined by the communications device meets the following condition: A difference between TA offsets of every two carriers in the TAG when the TAG is a first-type TAG is the same as a difference between TA offsets of every two carriers in the TAG when the TAG is a second-type TAG. Usually, the first-type TAG is also referred to as a pTAG, and the second-type TAG is also referred to as an sTAG. In other words, when the TAG is a pTAG, a difference between a TA offset of a first carrier in the pTAG and a TA offset of a second carrier in the pTAG is a first difference; or when the TAG is an sTAG, a difference between a TA offset of a first carrier in the sTAG and a TA offset of a second carrier in the sTAG is a second difference, and the first difference is the same as the second difference. Herein, the first carrier and the second carrier are any two carriers in the TAG.

It should be pointed out that, for one communications device, a TAG corresponding to the communications device may be a pTAG or an sTAG. In other words, the communications device may correspond to only one of the pTAG and the sTAG. Certainly, carriers included in the TAG corresponding to the communications device when the TAG is the pTAG are the same as carriers included in the TAG corresponding to the communications device when the TAG is the sTAG. Because the difference between the TA offsets of every two carriers in the pTAG is the same as the difference between the TA offsets of every two carriers in the sTAG, uplink signals from different UEs on one CC can simultaneously arrive at a base station.

Figure 3:
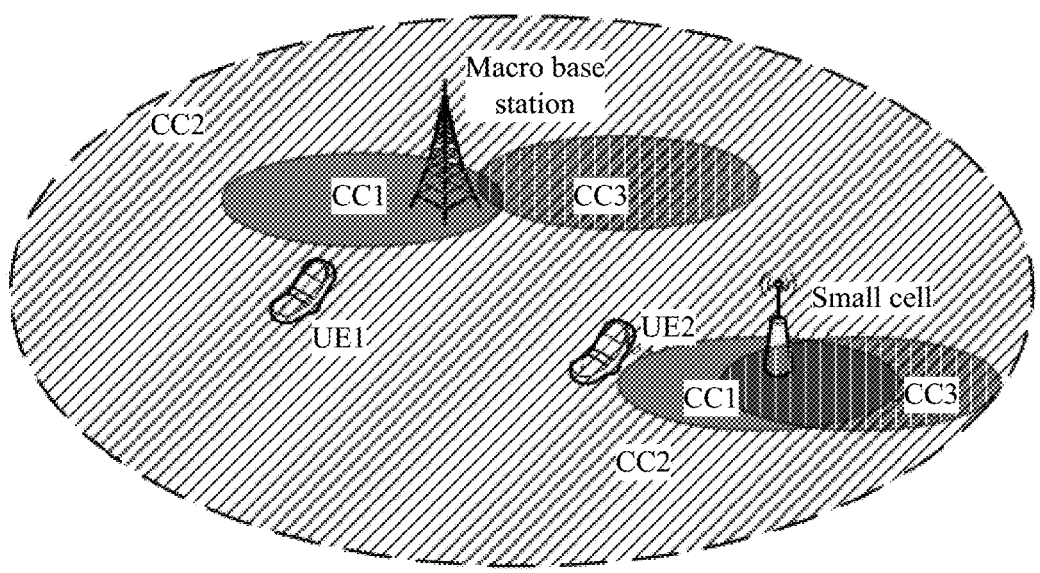
FIG. 3 is a schematic diagram of multi-terminal uplink transmission in carrier aggregation according to an embodiment of this application.

For example, as shown in FIG. 3, UE2 receives a TAC from a macro base station, where the TAC includes a TA reference value 0.6 μs corresponding to an sTAG. Based on a condition that a TA offset needs to meet, the UE2 performs the following configurations: In the sTAG, a TA offsets of a carrier CC1 is 0.05 μs, a TA offset2 of a carrier CC2 is 0.2 μs, and a TA offset3 of a carrier CC3 is 0 μs, as listed in Table 3; or in the pTAG, a TA offset1 of a carrier CC1 is 0.1 μs, a TA offset2 of a carrier CC2 is 0.25 μs, and a TA offset3 of a carrier CC3 is 0.05 μs, as listed in Table 4. It can be learned that, in the sTAG, a difference between the TA offset1 of the carrier CC1 and the TA offset2 of the carrier CC2 is −0.15 μs, and in the pTAG, a difference between the TA offset1 of the carrier CC1 and the TA offset2 of the carrier CC2 is also −0.15 μs; in the sTAG, a difference between the TA offset2 of the carrier CC2 and the TA offset3 of the carrier CC3 is 0.2 μs, and in the pTAG, a difference between the TA offset1 of the carrier CC2 and the TA offset2 of the carrier CC3 is also 0.2 μs; in the sTAG, a difference between the TA offset1 of the carrier CC1 and the TA offset3 of the carrier CC3 is 0.05 μs, and in the pTAG, a difference between the TA offset1 of the carrier CC1 and the TA offset3 of the carrier CC3 is also 0.05 μs.

TABLE 3

| sTAG | | |
|---|---|---|
| Carrier CC1 (TDD) | TA reference value = 0.6 μs | TA offset1 = 0.05 μs |
| Carrier CC2 (TDD) | TA reference value = 0.6 μs | TA offset2 = 0.2 μs |
| Carrier CC3 (FDD) | TA reference value = 0.6 μs | TA offset3 = 0.0 μs |

TABLE 4

| pTAG | | |
|---|---|---|
| Carrier CC1 (TDD) | TA reference value | TA offset1 = 0.1 μs |
| Carrier CC2 (TDD) | TA reference value | TA offset2 = 0.25 μs |
| Carrier CC3 (FDD) | TA reference value | TA offset3 = 0.05 μs |

Considering a stipulation of an LTE protocol, the communications device adjusts the uplink transmission timing of each carrier in the TAG based on a TA offset of a primary component carrier and the TA reference value. Therefore, in the pTAG, the TA offset actually used for each carrier is the same as the TA offset of the primary component carrier. If the pTAG in Table 4 still follows the stipulation of the LTE protocol, uplink synchronization still cannot be implemented. Therefore, it is stipulated in this embodiment of this application that, TA offsets of all carriers in the TAG are set separately. Setting the TA offsets separately means the following: If there are two carriers in the pTAG: a carrier A and a carrier B, a terminal determines a TA offset of the carrier A without referring to a TA offset of the carrier B, or a terminal determines a TA offset of the carrier A that is different from a TA offset of the carrier B. A simple separate setting manner is to set a same TA offset for one carrier in both the pTAG and the sTAG. For another example, in Table 4, in the pTAG, the TA offset actually used for each carrier is not the same as the TA offset of the primary component carrier. Assuming that the primary component carrier is the carrier CC1, an actually used value of the TA offset2 of the carrier CC2 is still 0.25 μs, and is the same as the TA offset used for the carrier CC2 in the sTAG; and an actually used value of the TA offset3 of the carrier CC3 is still 0.05 μs.

In this embodiment of this application, signal synchronization between different users on one uplink carrier may be alternatively implemented in another manner. For example, it is stipulated that some frame/slot boundaries at which one UE sends signals on different uplink carriers in the pTAG and the sTAG are the same. Herein, a main reason why some frame/slot boundaries are the same is that slot lengths on different numerologies (carrier information) are different. For example, a subcarrier spacing of the carrier CC1 is 15 kHz, and duration of a slot is 1 ms; and a subcarrier spacing of the carrier CC2 is 30 kHz, and duration of a slot is 0.5 ms. In this case, one slot on the CC1 corresponds to two slots on the CC2, and the slot on the CC1 has the same start point as the first slot in two consecutive slots on the CC2, and has the same end point as the second slot in the two consecutive slots on the CC2. In this solution, a problem that needs to be resolved in this embodiment of this application is how to determine a TA offset for a TAG if different carriers in the TAG correspond to different TA offsets, so that when a timing advance is performed, a same TA offset is used for all the carriers to adjust the timing advance. In the current pTAG, the TA offset is a TA offset corresponding to a PCell or a PSCell. Therefore, the present invention mainly discusses a manner of determining TA offsets actually used for all carriers in the sTAG. Optionally, this manner may also be applied to the pTAG.

In a manner, the communications device also adjusts the uplink transmission timing of each carrier in the TAG based on the TA reference value and a maximum TA offset, where the maximum TA offset is a maximum value of the TA offsets of all the carriers in the TAG. For example, in FIG. 3, a problem that currently exists in Table 1 and Table 2 is as follows: The difference between the actual TA adjustment value 1.1 μs of the carrier CC1 for the UE1 and the actual TA adjustment value 1.1 μs of the carrier CC2 for the UE1 is 0, and the difference between the actual TA adjustment value 0.65 μs of the carrier CC1 for the UE2 and the actual TA adjustment value 0.8 μs of the carrier CC2 for the UE2 is −0.15 μs. Because the two differences are not equal, the UE1 and the UE2 do not implement uplink synchronization on the carrier CC2. To resolve this problem, the UE2 may choose to use a maximum TA offset 0.2 μs in the sTAG to adjust uplink transmission timings of the three carriers in the sTAG. To be specific, in the sTAG, an actual adjustment value of the carrier CC1 is 0.8 μs, an actual adjustment value of the carrier CC2 is 0.8 μs, and an actual adjustment value of the carrier CC3 is 0.8 μs, as listed in Table 5. In this way, a difference between the actual TA adjustment value 1.1 μs of the carrier CC1 for the UE1 and the actual TA adjustment value 1.1 μs of the carrier CC2 for the UE1 is 0, and a difference between the actual TA adjustment value 0.8 μs of the carrier CC1 for the UE2 and the actual TA adjustment value 0.8 μs of the carrier CC2 for the UE2 is also 0. Therefore, if the UE1 and the UE2 implement uplink synchronization on the CC1, the UE1 and the UE2 also implement uplink synchronization on the carrier CC2.

TABLE 5

| | sTAG | | |
|---|---|---|---|
| Carrier CC1 (TDD) | TA reference value = 0.6 μs | TA offset1 = 0.05 μs | Actual TA adjustment value 1 = 0.8 μs |
| Carrier CC2 (TDD) | TA reference value = 0.6 μs | TA offset2 = 0.2 μs | Actual TA adjustment value 2 = 0.8 μs |
| Carrier CC3 (FDD) | TA reference value = 0.6 μs | TA offset3 = 0.0 μs | Actual TA adjustment value 3 = 0.8 μs |

In addition to the foregoing method for determining the TA offset actually used for all the carriers, a TA offset corresponding to an SCell with a smallest number, namely a smallest SCellIndex, in the sTAG may be selected as the TA offset actually used for all the carriers in the sTAG. Assuming that an SCellIndex of a cell 1 is 5, an SCellIndex of a cell 2 is 3, and an SCellIndex of a cell 3 is 6, a TA offset 0.2 μs of the cell 2 is selected as the TA offset actually used for the cell 1, the cell 2, and the cell 3. A final adjustment result is still listed in Table 5.

In addition to a preset rule, the base station may indicate, by configuring for a user a TA offset used in the sTAG, an actual TA offset used for all the carriers in the TAG.

In this embodiment of this application, different TA offsets of carriers may be determined by the communications device based on different carrier information of the carriers. The carrier information is usually a numerology, and the numerology is a parameter used in a communications system. The communications system (for example, a 5G system) may support a plurality of numerologies. The numerology may be defined by using one or more of the following parameter information: a subcarrier spacing, a cyclic prefix (CP), a time unit, a bandwidth, and the like.

For example, the numerology may be defined by using the subcarrier spacing and the CP. The subcarrier spacing may be 15 kHz, 30 kHz, 60 kHz, 120 kHz, 240 kHz, 480 kHz, or the like. For example, different subcarrier spacings may be an integer multiple of 15 kHz. It can be understood that the subcarrier spacing may be alternatively designed to another value. CP information may include a CP length and/or a CP type. For example, the CP may be a normal CP (NCP) or an extended CP (ECP).

The time unit is used to represent a time unit in time domain. For example, the time unit may be a sampling point, a symbol, a mini-slot, a slot, a subframe, or a radio frame. Time unit information may include a type, a length, a structure, or the like of the time unit. The bandwidth may be resources that are consecutive in frequency domain. Sometimes, the bandwidth may be referred to as a bandwidth part (BWP), a carrier bandwidth part, a subband bandwidth, a narrowband bandwidth, or another name. The name is not limited in this application. For example, one BWP includes K (K>0) consecutive subcarriers; or one BWP is a frequency domain resource corresponding to N non-overlapping consecutive resource blocks (resource block, RB), where a subcarrier spacing of the RB may be 15 kHz, 30 kHz, 60 kHz, 120 kHz, 240 kHz, 480 kHz, or another value. Alternatively, one BWP is a frequency domain resource corresponding to M non-overlapping consecutive resource block groups (RBG), where one RBG includes P consecutive RBs, and a subcarrier spacing of the RB may be 15 kHz, 30 kHz, 60 kHz, 120 kHz, 240 kHz, 480 kHz, or another value, for example, an integer multiple of 15 kHz×2.

Because the carrier information may be defined by using the parameter such as the subcarrier spacing or the bandwidth, different TA offsets may be determined based on different parameters. The following specifically describes several implementations.

In an implementation 1, the communications device determines the TA offset of each carrier based on the subcarrier spacing of the carrier. For example, carriers whose subcarrier spacings are 15 kHz, 30 kHz, and 60 kHz correspond to a same TA offset, and a carrier whose subcarrier spacing is 120 kHz and another carriers whose subcarrier spacing are greater than 120 kHz correspond to a same TA offset. Generally, it is stipulated that a carrier whose subcarrier spacing is less than or equal to 60 kHz and a carrier whose subcarrier spacing is greater than 60 kHz cannot coexist in one TAG. In other words, one TAG either includes only a plurality of carriers whose subcarrier spacings are less than or equal to 60 kHz or include only a plurality of carriers whose subcarrier spacings are greater than 60 kHz.

In an implementation 2, for any carrier, the communications device determines whether a frequency band of the carrier is less than a specified frequency value, and if the frequency band of the carrier is less than the specified frequency value, the communications device determines that the TA offset of the carrier is a first threshold; or if the frequency band of the carrier is not less than the specified frequency value, the communications device determines that the TA offset of the carrier is a second threshold, where the first threshold is greater than the second threshold. For example, using 6 GHz as a demarcation point, a TA offset of a carrier whose frequency band is less than 6 GHz is about 13 µs, and a TA offset of a carrier whose frequency band is greater than or equal to 6 GHz is about 7 µs.

Figure 5:
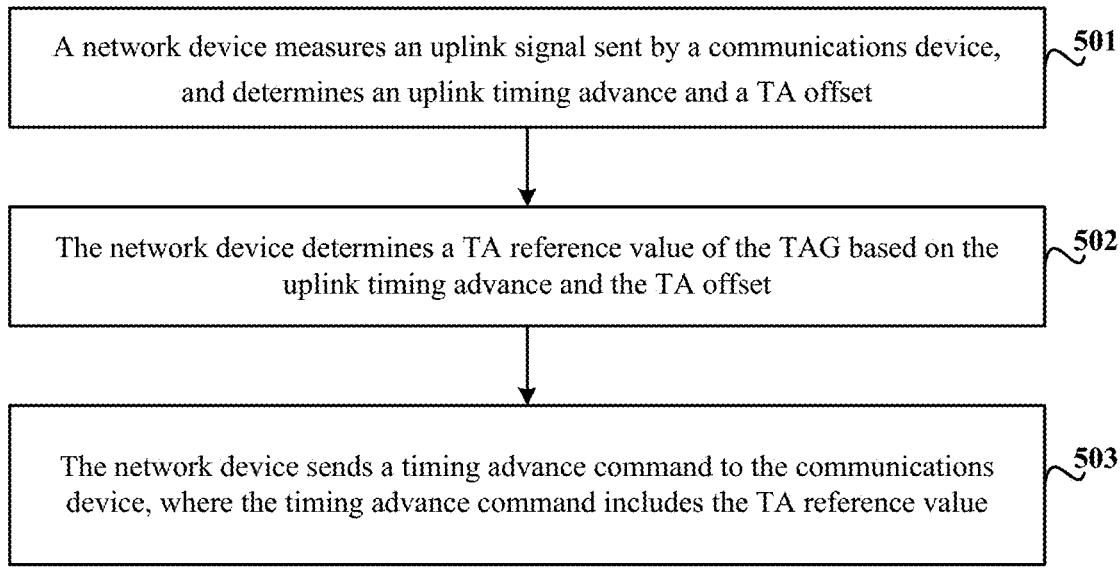
FIG. 5 is a schematic flowchart of an uplink synchronization method performed by a network device according to an embodiment of this application.

FIG. 5 shows an example of another uplink synchronization process according to this application. The method is performed by a network device.

Step 501: The network device determines an uplink timing advance and a TA offset based on an uplink signal sent by a communications device, where the uplink timing advance and the TA offset correspond to a carrier in a timing advance group TAG, and the carrier is used to carry the uplink signal.

Step 502: The network device determines a TA reference value of the TAG based on the uplink timing advance and the TA offset, where the TA reference value is a difference between the uplink timing advance and the TA offset.

Step 503: The network device sends a timing advance command to the communications device, where the timing advance command includes the TA reference value.

The TA reference value of the TAG that is determined by the network device is a difference between an uplink timing advance of each carrier in the TAG and a TA offset of the carrier, and the TA offset meets the following condition: A difference between TA offsets of every two carriers in a pTAG is the same as a difference between TA offsets of every two carriers in an sTAG.

In other words, the network device receives uplink signals sent by communications devices in one cell, detects that UE has sent a preamble signal, and estimates the TA reference value by using the received preamble signal. In addition, when forming a TAG, a base station puts carriers with same TA offset values into one group. This can avoid a problem that uplink transmission from terminals is non-synchronized. For example, when forming the pTAG and the sTAG in FIG. 2, the base station classifies the carrier CC1 and the carrier CC2 with the same TA reference values and the same TA offsets into one group, as listed in Table 6 and Table 7.

TABLE 6

| pTAG | | | |
|---|---|---|---|
| Carrier CC1 (TDD) | TA reference value = 1 µs | TA offset1 = 0.1 µs | Actual TA adjustment value 1 = 1.1 µs |
| Carrier CC2 (TDD) | TA reference value = 1 µs | TA offset2 = 0.1 µs | Actual TA adjustment value 2 = 1.1 µs |
| Carrier CC3 (FDD) | TA reference value = 1 µs | TA offset3 = 0.0 µs -> 0.1 µs | Actual TA adjustment value 3 = 1.1 µs |

TABLE 7

| pTAG | | | |
|---|---|---|---|
| Carrier CC1 (TDD) | TA reference value = 1 µs | TA offset1 = 0.2 µs | Actual TA adjustment value 1 = 1.2 µs |
| Carrier CC2 (TDD) | TA reference value = 1 µs | TA offset2 = 0.2 µs | Actual TA adjustment value 2 = 1.2 µs |
| Carrier CC3 (FDD) | TA reference value = 1 µs | TA offset3 = 0.0 µs -> 0.2 µs | Actual TA adjustment value 3 = 1.2 µs |

In addition to a manner in which the base station proactively adjusts TAG grouping, in this embodiment of the present invention, for another manner of adjusting the TA offset, refer to implementations listed for a communications device side. Details are not repeated herein.

Figure 6:
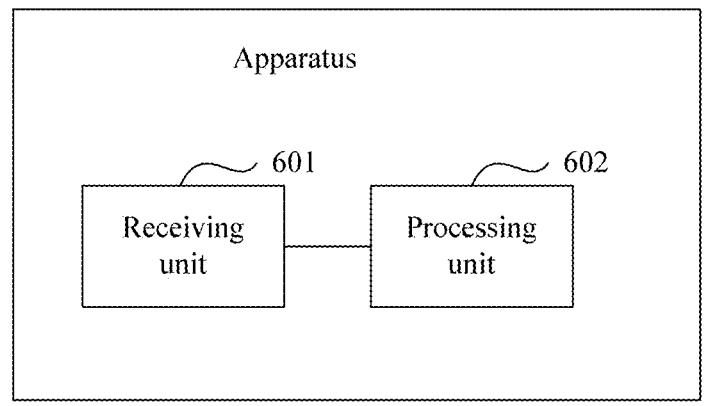
FIG. 6 is a schematic structural diagram of an apparatus according to an embodiment of this application.

For the uplink transmission method performed by the communications device, this application provides an apparatus. For specific content performed by the apparatus, refer to the foregoing method embodiment. FIG. 6 is a schematic structural diagram of the apparatus provided in this application. The apparatus includes a receiving unit 601 and a processing unit 602.

The receiving unit 601 is configured to receive a timing advance command sent by a network device, where the timing advance command includes a timing advance TA reference value, and the TA reference value corresponds to a carrier in a timing advance group TAG.

The processing unit 602 is configured to: determine a TA offset of the carrier based on carrier information of the carrier, and adjust an uplink transmission timing of the carrier based on the TA reference value and the TA offset of the carrier.

When the TAG includes a plurality of carriers, the TA offset meets the following condition: when the TAG is a first-type TAG, a difference between TA offsets of every two carriers in the TAG is a first difference; or when the TAG is a second-type TAG, a difference between TA offsets of every two carriers in the TAG is a second difference, where the first difference is the same as the second difference, at least one carrier in the first-type TAG corresponds to a primary serving cell PCell or a primary secondary serving cell PSCell, and all carriers in the second-type TAG correspond to a secondary serving cell Scell.

In an embodiment, when the TAG includes a plurality of carriers, the processing unit 602 is configured to adjust uplink transmission timings of the plurality of carriers in the TAG based on the TA reference value and a maximum TA offset, where the maximum TA offset is a maximum value of TA offsets of the plurality of carriers. For example, a TA offset corresponding to a carrier A is 0.1 µs, and a TA offset corresponding to a carrier B is 0.2 µs. In this case, it is finally determined that the TA offset corresponding to the carrier A is 0.2 µs, and the TA offset corresponding to the carrier B is 0.2 µs.

In another embodiment, the processing unit 602 is configured to determine the TA offset of the carrier based on a frequency band of the carrier, where a TA offset determined when the frequency band of the carrier is less than a specified frequency value is greater than a TA offset determined when the frequency band of the carrier is greater than or equal to the specified frequency value.

In another possible implementation, the processing unit 602 is configured to determine the TA offset of each carrier based on a subcarrier spacing of the carrier, where a TA offset determined when the subcarrier spacing of the carrier is less than a specified value is greater than a TA offset determined when the subcarrier spacing of the carrier is greater than or equal to the specified value.

In a possible implementation, the subcarrier spacing corresponding to the carrier in the TAG is less than or equal to 60 kHz, or the subcarrier spacing corresponding to the carrier in the TAG is greater than 60 kHz. Alternatively, the TA offsets of all the carriers in the TAG are set separately.

In this embodiment of this application, these units may perform corresponding functions in the embodiment in FIG. 4. For details, refer to the detailed descriptions in the embodiment. Details are not repeated herein.

In this application, the communications device may be divided into functional modules based on the foregoing embodiment. For example, functional modules corresponding to various functions may be obtained through division, or at least two functions may be integrated into one processing module. The integrated module may be implemented in a form of hardware, or may be implemented in a form of a software functional module. It should be noted that, in this application, module division is an example, and is merely a logical function division. During actual implementation, another division manner may be used.

Figure 7:
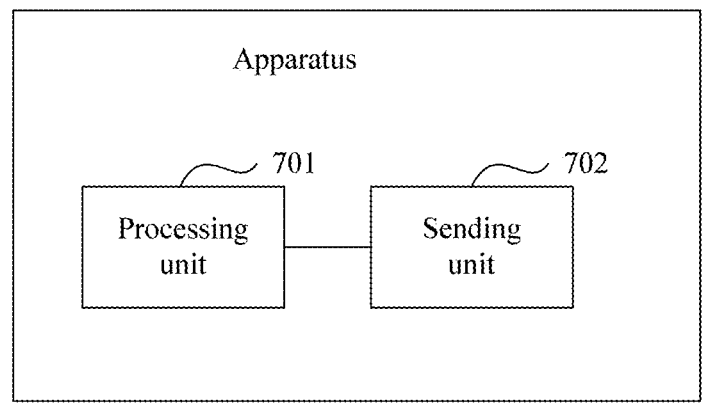
FIG. 7 is a schematic structural diagram 1 of another apparatus according to an embodiment of this application.

For the foregoing uplink synchronization method performed by the network device, this application provides an apparatus. For specific content performed by the apparatus, refer to the foregoing method embodiment. FIG. 7 is a schematic structural diagram of the apparatus provided in this application. The apparatus includes a processing unit 701 and a sending unit 702.

The processing unit 701 is configured to: determine an uplink timing advance and a TA offset based on an uplink signal sent by a communications device, and determine a TA reference value based on the uplink timing advance and the TA offset, where the TA reference value corresponds to a carrier in a timing advance group TAG, and the TA reference value is a difference between the uplink timing advance and the TA offset.

The sending unit 702 is configured to send a timing advance command to the communications device, where the timing advance command includes the TA reference value.

It should be noted that, when the TAG includes a plurality of carriers, the TA offset meets the following condition: when the TAG is a first-type TAG, a difference between TA offsets of every two carriers in the TAG is a first difference; or when the TAG is a second-type TAG, a difference between TA offsets of every two carriers in the TAG is a second difference, where the first difference is the same as the second difference, at least one carrier in the first-type TAG corresponds to a primary serving cell PCell or a primary secondary serving cell PSCell, and all carriers in the second-type TAG correspond to a secondary serving cell SCell.

In a possible design, the processing unit 701 is specifically configured to determine the TA reference value based on the uplink timing advance and a maximum TA offset, where the maximum TA offset is a maximum value of TA offsets of the plurality of carriers in the TAG serving the communications device.

It can be learned that, the uplink transmission timing of each carrier in the TAG is adjusted by using the TA reference value and the maximum TA offset. Therefore, the first difference and the second difference are both 0, because this can ensure uplink synchronization with uplink transmission from another communications device, located in the same cell as the communications device, on another TAG.

In a possible design, the processing unit 701 is specifically configured to determine the TA offset of the carrier based on a frequency band of the carrier, where a TA offset determined when the frequency band of the carrier is less than a specified frequency value is greater than a TA offset determined when the frequency band of the carrier is greater than or equal to the specified frequency value.

In another possible design, the processing unit 701 is specifically configured to determine the TA offset of each carrier based on a subcarrier spacing of the carrier, where a TA offset determined when the subcarrier spacing of the carrier is less than a specified value is greater than a TA offset determined when the subcarrier spacing of the carrier is greater than or equal to the specified value.

In a possible implementation, the subcarrier spacing corresponding to the carrier in the TAG is less than or equal to 60 kHz, or the subcarrier spacing corresponding to the carrier in the TAG is greater than 60 kHz. Alternatively, the TA offsets of all the carriers in the TAG are set separately.

It should be understood that the apparatus may be configured to implement the steps performed by the network device in the uplink synchronization method provided in this application. For related features, refer to the foregoing descriptions. Details are not repeated herein.

In this application, the network device may be divided into functional modules based on the foregoing embodiment. For example, functional modules corresponding to various functions may be obtained through division, or at least two functions may be integrated into one processing module. The integrated module may be implemented in a form of hardware, or may be implemented in a form of a software functional module. It should be noted that, in this application, module division is an example, and is merely a logical function division. During actual implementation, another division manner may be used.

The storing in this application may mean storing in one or more memories. The one or more memories may be disposed separately, or may be integrated into an encoder or a decoder, a processor, a chip, a communications apparatus, or a terminal. Alternatively, some of the one or more memories may be disposed separately, and some of the one or more memories may be integrated into a decoder, a processor, a chip, a communications apparatus, or a terminal. The memory may be any form of storage medium. This is not limited in this application.

Figure 8:
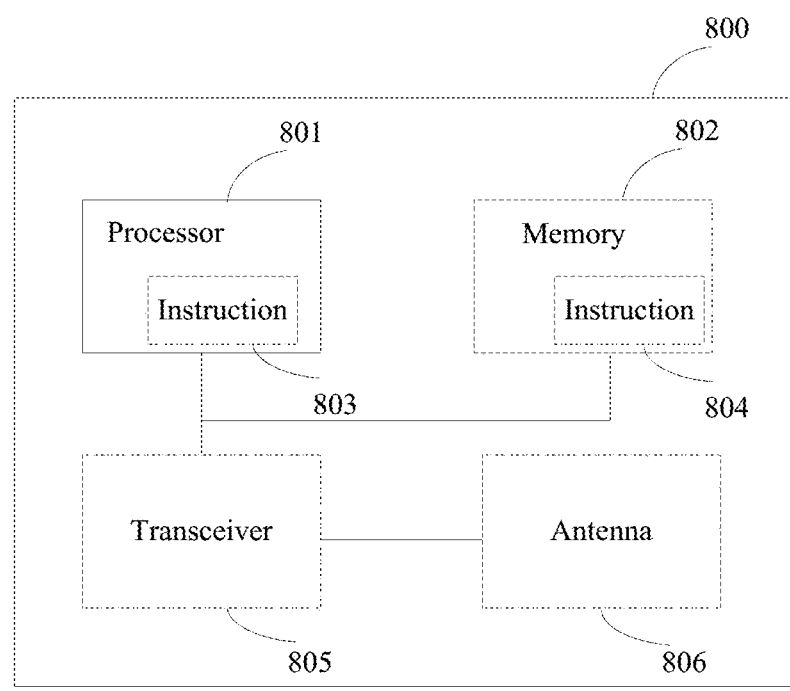
FIG. 8 is a schematic structural diagram 1 of a communications apparatus according to an embodiment of this application.

An embodiment of this application further provides a communications apparatus. The communications apparatus includes a processor and a memory. The memory stores a computer program. When the processor reads and executes the computer program stored in the memory, the communications apparatus is enabled to implement the method performed by the communications device in the process shown in FIG. 4 or the method performed by the network device in the process shown in FIG. 5. FIG. 8 is a schematic structural diagram of a communications apparatus 800. The apparatus 800 may be configured to implement the methods described in the foregoing method embodiments. For details, refer to the descriptions in the foregoing method embodiments. The communications apparatus 800 may be a chip, a base station, a terminal, or another network device.

The communications apparatus 800 includes one or more processors 801. The processor 801 may be a general-purpose processor, a special-purpose processor, or the like. For example, the processor 801 may be a baseband processor or a central processing unit. The baseband processor may be configured to process a communication protocol and communication data, and the central processing unit may be configured to: control the communications apparatus (such as the base station, the terminal, or the chip), execute a software program, and process data of the software program.

In a possible design, one or more modules shown in FIG. 6 and FIG. 7 may be implemented by using one or more processors, or one or more processors and memories.

In a possible design, the communications apparatus 800 includes the one or more processors 801, and the one or more processors 801 may implement the foregoing uplink synchronization methods. For example, the communications apparatus may be a base station. For determining of an uplink TA reference value and TA offset, refer to the descriptions in the related parts of FIG. 4 and FIG. 5. Details are not repeated herein.

Optionally, in a design, the processor 801 may include an instruction 803 (which may also be referred to as code or a program in some cases). The instruction may be run on the processor, so that the communications apparatus 800 performs the methods described in the foregoing embodiments. In another possible design, the communications apparatus

800 may further include a circuit, and the circuit may implement an uplink synchronization function in the foregoing embodiments.

Optionally, in a design, the communications apparatus 800 may include one or more memories 802. The memory 802 stores an instruction 804, and the instruction may be run on the processor, so that the communications apparatus 800 performs the methods described in the foregoing method embodiments.

Optionally, the memory may further store data. Optionally, the processor may also store an instruction and/or data. The processor and the memory may be disposed separately or integrated together.

Optionally, the "storing" in the foregoing embodiment may mean storing in the memory 802 or storing in another peripheral memory or storage device.

Optionally, the communications apparatus 800 may further include a transceiver 805 and an antenna 806. The processor 801 may be referred to as a processing unit, and may control the communications apparatus (the terminal or the base station). The transceiver 805 may be referred to as a transceiver unit, a transceiver, a transceiver circuit, or the like, and is configured to implement a transmission and reception function of the communications apparatus by using the antenna 806.

The specific implementations of the foregoing apparatus embodiment correspond to those of the method embodiments. For the specific implementations and beneficial effects of the apparatus embodiment, refer to the related descriptions in the method embodiments.

An embodiment of this application further provides a chip. The chip is connected to a memory, the memory stores a computer program, and the chip is configured to read and execute the computer program stored in the memory, to implement the method performed by the communications device in the process shown in FIG. 4 or the method performed by the network device in the process shown in FIG. 5.

An embodiment of this application further provides a computer storage medium. The computer storage medium stores program code. When the stored program code is executed by a processor, the program code is used to implement the method performed by the communications device in the process shown in FIG. 4 in this application.

An embodiment of this application further provides a computer storage medium. The computer storage medium stores program code. When the stored program code is executed by a processor, the program code is used to implement the method performed by the network device in the process shown in FIG. 5 in this application.

An embodiment of this application further provides a computer program product. The computer program product includes a computer software instruction, and the computer software instruction may be loaded by a processor to implement the method performed by the communications device in the process shown in FIG. 4 in this application.

An embodiment of this application further provides a computer program product. The computer program product includes a computer software instruction, and the computer software instruction may be loaded by a processor to implement the method performed by the network device in the process shown in FIG. 5 in this application.

Figure 9:
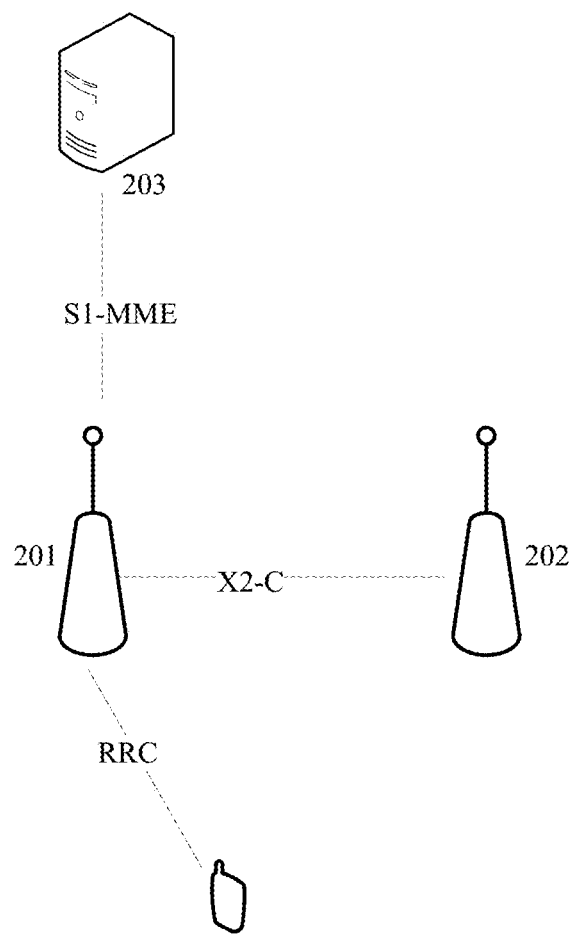
FIG. 9 is a schematic structural diagram of a dual-connectivity system according to an embodiment of this application.

An embodiment of this application further provides an uplink synchronization method. The uplink synchronization method is applicable to a communications system into which a dual-connectivity technology is introduced. In the dual-connectivity technology, a plurality of base stations simultaneously serve a terminal. Alternatively, the uplink synchronization method may also be applied to carrier aggregation under a premise of non-ideal backhaul. For example, one terminal may be connected to two base stations that are connected through non-ideal backhaul, for data communication. A typical scenario is as follows: One base station is a macro base station, and the other base station is a small base station, a micro base station, or a pico base station. For example, the macro base station and the small base station are connected through a standard X2 interface. FIG. 9 is a control-plane architecture topology of dual connectivity. 901 represents a master base station MeNB, where the MeNB may alternatively be a macro base station; 902 represents a secondary base station SeNB, where the SeNB may alternatively be a small base station; and 903 represents a core network device, for example, a mobility management entity (MME). A signaling connection among a terminal, the MeNB, and the MME may be as follows: For example, the terminal has one radio resource control (RRC) signaling link and one S1 signaling link. The SeNB and the MeNB are connected through an X2 interface or an enhanced X2 interface.

Carrier aggregation may be configured on both the MeNB and the SeNB in FIG. 9. In an evolved universal terrestrial radio access network (E-UTRAN)-new radio (NR) dual connectivity mode (EN-DC mode for short), considering network evolution steps, an E-UTRAN corresponds to a master cell group and NR corresponds to a secondary cell group by default currently. NR may also be referred to as a new generation network. A currently supported EN-DC band (bandwidth) combination includes one of the following band combinations:

LTE: for example, Band3, where a downlink bandwidth may be from 1805 MHz to 1880 MHz, and an uplink bandwidth may be from 1710 MHz to 1785 MHz (which is an FDD band frequency division duplex bandwidth), including an uplink (uplink, UL) carrier.

NR: for example, Band 78, where both uplink and downlink bandwidths may be from 3300 MHz to 3800 MHz.

NR: for example, Band 80, where an uplink bandwidth may be from 1710 MHz to 1785 MHz, including a supplementary uplink carrier (SUL).

Figure 10:
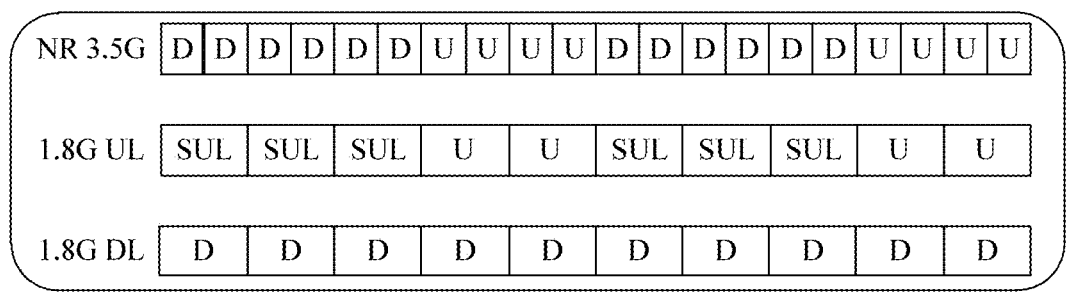
FIG. 10 is a schematic diagram of an intra-frequency carrier according to an embodiment of this application.

It can be learned that an NR SUL carrier and an LTE UL (uplink) carrier share same spectrum resources. For example, one 1.8G LTE cell and one NR cell corresponding to the SUL carrier form EN-DC. Optionally, when the NR SUL carrier and the LTE UL carrier are at a same working frequency, the UE not only can operate on the 1.8 G carrier of LTE band3, but also can operate on the 1.8 G SUL carrier of NR SUL band 80. In this case, the LTE UL carrier and the NR SUL carrier can be multiplexed on 1.8G uplink frequency domain resources in a TDM time division multiplexing mode or an FDM frequency division multiplexing mode. FIG. 10 is an example diagram of TDM time division multiplexing. In this embodiment of the present invention, the NR SUL carrier and an NR UL carrier may belong to one TAG, and a TA offset of the NR SUL carrier is determined based on a TA offset of the NR UL carrier.

In this embodiment of the present invention, an uplink resource may be understood as a portion of carriers (including a carrier in a non-CA scenario and a CC in a CA scenario) that is used for uplink transmission or a portion of serving cells (including a serving cell in a CA scenario and a serving cell in a non-CA scenario) that is used for uplink transmission. The CC in the CA scenario may be a primary CC or a secondary CC, and the serving cell in the CA scenario may be a primary cell (PCell) or a secondary cell SCell). The uplink resource may also be referred to as an uplink carrier. Correspondingly, a portion of carriers or serving cells that is used for downlink transmission may be understood as a downlink resource or a downlink carrier. For example, in a frequency division duplex (FDD) system, on a carrier, a frequency resource used for uplink transmission may be understood as an uplink resource or an uplink carrier, and a frequency resource used for downlink transmission may be understood as a downlink resource or a downlink carrier. For another example, in a time division duplex (TDD) system, on a carrier, a time domain resource used for uplink transmission may be understood as an uplink resource or an uplink carrier, and a time domain resource used for downlink transmission may be understood as a downlink resource or a downlink carrier.

It should be pointed out that, in LTE and NR, a cell is a higher-layer concept, and a carrier is a physical-layer concept. There is a correspondence between the cell and the carrier. For example, in LTE, one cell may be configured to include one pair of uplink and downlink carriers or only one downlink carrier. In NR, one cell may be configured to include one pair of uplink and downlink carriers, or only one downlink carrier, or one downlink carrier, one uplink carrier, and one supplementary uplink carrier (SUL). Due to the correspondence between the carrier and the cell, one carrier corresponds to only one cell, and the corresponding carrier can be found once the cell is configured, or the corresponding cell can be found once the carrier is configured. Therefore, the cell and the carrier are not strictly distinguished from each other in the present invention, and may be used interchangeably in a case of no confusion.

In the foregoing EN-DC scenario, because $N_{TA\text{-}offset1}$ corresponding to an LTE FDD carrier is 0, a timing advance of the LTE UL carrier that is adjusted by the UE may be determined based on a TA reference value, that is, $N_{TA1}=TA1+N_{TA\text{-}offset1}$. However, $N_{TA\text{-}offset2}$ of an NR 3.5G TDD carrier is 13 µs, and a timing advance of the SUL carrier that is adjusted by the UE may be determined based on a TA reference value and a TA offset, that is, $N_{TA2}=TA2+N_{TA\text{-}offset2}$. Because the NR SUL carrier and the LTE UL carrier share an LTE UL time-frequency resource, to ensure orthogonality in time domain, the timing advance of the LTE UL carrier needs to be equal to the timing advance of the NR SUL carrier, that is, $TA1+N_{TA\text{-}offset1}=TA2+N_{TA\text{-}offset2}$. Herein, LTE uses an FDD carrier, that is, NTA-offset1=0, while TA reference values TA1 and TA2 sent by an LTE network and an NR network are both greater than or equal to 0. Therefore, to ensure that the two TA adjustment values are equal, it needs to be at least ensured that the TA1 of the LTE UL carrier is greater than or equal to the TA offset of the SUL carrier, that is, $TA1 \geq N_{TA\text{-}offset2}$. A TA command for the LTE UL carrier that is received by the UE assumes that the obtained TA1 is greater than or equal to the TA offset of the SUL carrier. In this embodiment of the present invention, optionally, for LTE, when determining that the received TA1 is greater than or equal to $N_{TA\text{-}offset2}$, the UE may add an SUL cell at the same frequency as the LTE UL carrier, as a PSCell, so as to implement uplink synchronization. For NR, when determining that the received TA2 is greater than or equal to $N_{TA\text{-}offset1}-N_{TA\text{-}offset2}$, the UE adds an SUL cell at the same frequency as the LTE UL carrier, as a PSCell, so as to implement uplink synchronization.

Figure 11:
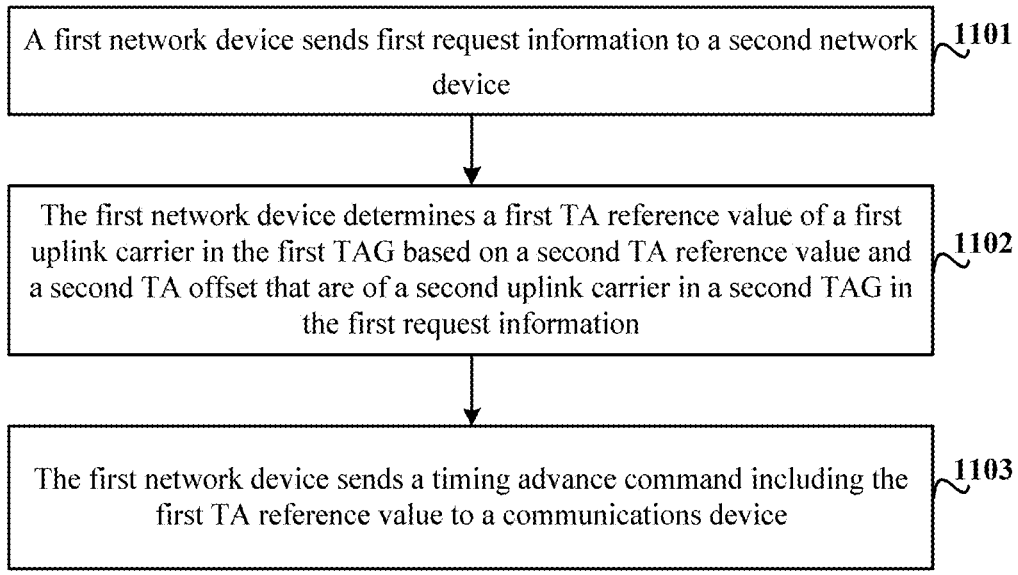
FIG. 11 is a schematic diagram of an uplink synchronization method at a network device side according to an embodiment of this application.

Based on the foregoing reasons, an embodiment of this application provides a schematic flowchart of an uplink synchronization method, as shown in FIG. 11.

Step 1101: A first network device sends a request to a second network device.

In this step, the first network device may request, from the second network device, a second TA reference value and/or a second TA offset of a second uplink carrier in a second TAG, so as to obtain the foregoing information from the second network device.

Step 1102: The first network device determines a first TA reference value of a first uplink carrier in a first TAG based on the second TA reference value and the second TA offset of the second uplink carrier in the second TAG.

Step 1103: The first network device sends a timing advance command including the first TA reference value to a communications device.

In the foregoing steps, the first TAG corresponds to the first network device of a first communications standard, and the second TAG corresponds to the second network device of a second communications standard. The second TA offset may be a predefined fixed value. In this case, the first network device may not request the second TA offset from the second network device. For example, in an EN-DC scenario, the first communications standard may be LTE, and the second communications standard is NR; or the first communications standard may be NR, and the second communications standard is LTE.

The following describes the two scenarios separately.

Scenario 1

When the first communications standard is LTE, and the second communications standard is NR, the first network device may be an LTE base station, the second network device may be an NR base station, the first uplink carrier may be an LTE UL carrier, and the second uplink carrier may be an NR SUL carrier. In this scenario, the LTE base station obtains, from the NR base station, a TA reference value and a TA offset of the NR SUL carrier, and then determines a TA reference value of the LTE UL carrier based on the TA reference value and the TA offset of the NR SUL carrier. The LTE base station may send the determined TA reference value to the communications device by using a timing advance command (TAC), and the communications device adjusts an uplink transmission timing of a UL carrier based on the TA reference value of the UL carrier and the TA offset of the UL carrier.

For example, for an NR uplink timing advance, $N_{TA2}=TA2+N_{TA\text{-}offset2}$, where TA2 represents the second TA reference value in FIG. 11, and $N_{TA\text{-}offset2}$ represents the second TA offset in FIG. 11. For an LTE uplink timing advance, $N_{TA1}=TA1+N_{TA\text{-}offset1}$, where TA1 represents the first TA reference value in FIG. 11, and $N_{TA\text{-}offset1}$ represents the first TA offset in FIG. 11. Therefore, to implement uplink synchronization, $N_{TA2}$ needs to be equal to $N_{TA1}$, and the LTE base station requests to obtain TA2 and $N_{TA\text{-}offset2}$ of the NR base station from the NR base station.

In a possible implementation, the LTE base station determines that TA1 is at least greater than or equal to a difference between $N_{TA\text{-}offset2}$ of the NR base station and $N_{TA\text{-}offset1}$ of the LTE base station. For example, TA1 is equal to TA2+$N_{TA\text{-}offset2}-N_{TA\text{-}offset1}$.

In another possible implementation, when the first uplink carrier is an FDD carrier, $N_{TA\text{-}offset1}$ is usually equal to 0, and TA1 delivered by the LTE base station is at least greater than or equal to $N_{TA\text{-}offset2}$ of the NR base station. It should be noted that, $N_{TA\text{-}offset2}$ of the SUL carrier of the NR base station is usually equal to a TA offset of an NR UL carrier that corresponds to the same serving cell as the SUL carrier.

In still another possible implementation, if a TAG to which the LTE UL carrier belongs still has at least one LTE TDD carrier, the TAG is the second TAG corresponding to the second network device, and $N_{TA\text{-}offset1}$ of the LTE UL carrier changes from 0 to a value equal to a TA offset of the LTE TDD carrier. In this case, TA1 is at least greater than or equal to a difference between $N_{TA\text{-}offset2}$ of the NR base station and $N_{TA\text{-}offset1}$ of the LTE base station.

Scenario 2

When the first communications standard is NR, and the second communications standard is LTE, the first network device may be an NR base station, the second network device may be an LTE base station, the first uplink carrier may be an NR SUL carrier, and the second uplink carrier may be an LTE UL carrier. In this case, the first uplink carrier and the second uplink carrier may be intra-frequency carriers. In this scenario, the NR base station obtains, from the LTE base station, a TA reference value and a TA offset of the LTE UL carrier, and then determines a TA reference value of the NR SUL carrier based on the TA reference value and the TA offset of the LTE UL carrier, where the TA offset may be predefined in a protocol. The NR base station may deliver the determined TA reference value to the communications device by using the TAC. In this way, the communications device can adjust an uplink transmission timing of the SUL carrier based on the TA reference value of the SUL carrier and a TA offset of the SUL carrier.

For example, for an NR uplink timing advance, $N_{TA2}=TA2+N_{TA\text{-}offset2}$, where TA2 represents the first TA reference value in FIG. 11, and $N_{TA\text{-}offset2}$ represents the first offset in FIG. 11. For an LTE uplink timing advance, $N_{TA1}=TA1+N_{TA\text{-}offset1}$, where TA1 represents the second TA reference value in FIG. 11, and $N_{TA\text{-}offset1}$ represents the second TA offset in FIG. 11. Therefore, to implement uplink synchronization, $N_{TA2}$ needs to be equal to $N_{TA1}$. In a possible implementation, the NR base station interacts with the LTE base station, proactively obtains TA1 and $N_{TA\text{-}offset1}$ of the LTE base station, and determines that TA2 is greater than or equal to a difference between $N_{TA\text{-}offset1}$ of the LTE base station and $N_{TA\text{-}offset2}$ of the NR base station. For example, TA2 is equal to $TA1+N_{TA\text{-}offset1}-N_{TA\text{-}offset2}$.

In a possible implementation, $N_{TA\text{-}offset2}$ of the first uplink carrier, namely, the NR SUL carrier, is usually equal to a TA offset of an NR UL carrier that corresponds to the same serving cell as the SUL carrier. The second uplink carrier, namely, the LTE UL carrier, is usually an FDD carrier. Therefore, $N_{TA\text{-}offset1}$ is usually equal to 0, and TA1 delivered by the LTE base station is greater than or equal to $N_{TA\text{-}offset2}$ of the NR base station.

In a possible implementation, if a TAG to which the LTE UL carrier belongs still has at least one LTE TDD carrier, the TAG is the second TAG corresponding to the second network device, the TAG may be an sTAG or a pTAG, and $N_{TA\text{-}offset1}$ of the LTE UL carrier changes from o to a value equal to a TA offset of the LTE TDD carrier. For example, TA2 is greater than or equal to a difference between $N_{TA\text{-}offset1}$ of the LTE base station and $N_{TA\text{-}offset2}$ of the NR base station.

It should be noted that, the first uplink carrier and the second uplink carrier in FIG. 11 may be intra-frequency carriers, or may be carriers that meet another frequency domain relationship. This is not specifically limited in this embodiment of this application.

Figure 12:
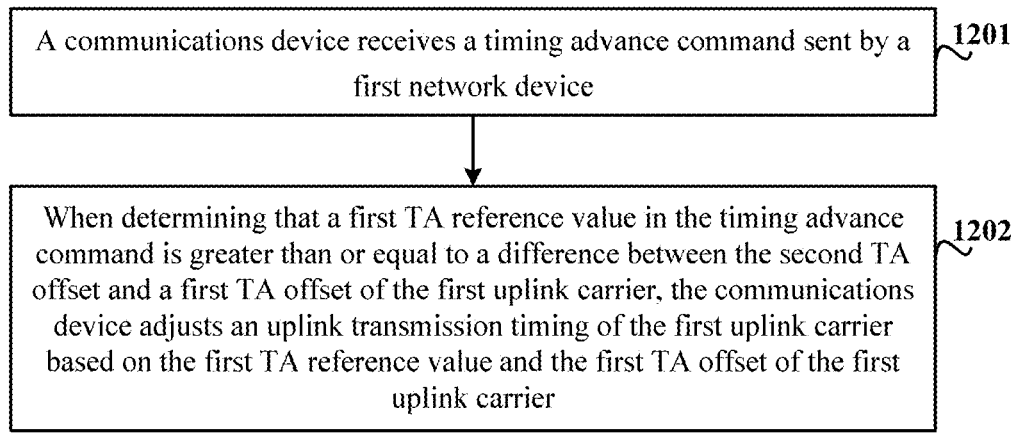
FIG. 12 is a schematic diagram of an uplink synchronization method at a communications device side according to an embodiment of this application.

In addition, an embodiment of this application further provides a schematic flowchart of an uplink synchronization method from a communications device side, as shown in FIG. 12.

Step 1201: A communications device receives a timing advance command sent by a first network device.

Step 1202: The communications device adjusts an uplink transmission timing of a first uplink carrier based on a first TA reference value in the timing advance command.

In this embodiment of the present invention, the communications device operates in a dual-connectivity mode. In the dual-connectivity mode, the communications device can establish connections to both a cell corresponding to the first uplink carrier in a first TAG and a cell corresponding to a second uplink carrier in a second TAG.

Optionally, the communications device adjusts the uplink transmission timing of the first uplink carrier based on the first TA reference value in the timing advance command and a first TA offset of the first uplink carrier. The first TA offset may be predefined in a protocol.

In addition, the first TAG corresponds to the first network device of a first communications standard, and the second TAG corresponds to a second network device of a second communications standard. For example, in an EN-DC scenario, the first communications standard may be LTE, and the second communications standard is NR; or the first communications standard may be NR, and the second communications standard is LTE.

The following describes the two scenarios separately.

Scenario 1

When the first communications standard is LTE, and the second communications standard is NR, the first network device may be an LTE base station, the second network device may be an NR base station, the first uplink carrier is an LTE UL carrier, and the second uplink carrier is an NR SUL carrier. In this scenario, the communications device receives a TAC command from the LTE base station, and the LTE base station determines a TA reference value of the LTE UL carrier after interacting with the NR base station. In a possible implementation, the TA reference value is greater than or equal to a difference between a TA offset of the SUL carrier and a TA offset of the UL carrier of the LTE base station. In this way, after receiving the TA offset of the LTE UL carrier, the communications device determines that a TA reference value of the UL carrier is greater than or equal to the TA offset of the SUL carrier. Then, uplink synchronization adjustment can be performed.

In a possible implementation, when the LTE UL carrier is an FDD carrier, a TA offset of the LTE UL carrier is equal to 0. Assuming that a TA offset of the NR SUL carrier is 13 µs, when the communications device determines that a TA reference value of a UL carrier is greater than or equal to 13 µs, uplink synchronization adjustment can be performed.

It should be noted that, the first uplink carrier and the second uplink carrier in FIG. 12 may be intra-frequency carriers, or may be carriers that meet another frequency domain relationship. This is not specifically limited in this embodiment of this application.

Scenario 2

When the first communications standard is NR, and the second communications standard is LTE, the first network device may be an NR base station, the second network device may be an LTE base station, the first uplink carrier is an NR SUL carrier, and the second uplink carrier is an LTE UL carrier. In this scenario, the communications device receives a TAC command from the NR base station. Because the NR base station determines a TA reference value of the NR SUL carrier after interacting with the LTE base station, the communications device may implement uplink synchronization after receiving the TA reference value.

In a possible implementation, the TA reference value is greater than or equal to a difference between a TA offset of a UL carrier and a TA offset of an SUL carrier of the NR base station. In this case, after receiving the TA offset of the NR SUL carrier, the communications device determines that the TA reference value of the SUL carrier is greater than or equal to a difference between the TA offset of the UL carrier and a TA offset of the SUL carrier of the NR base station. Then, uplink synchronization adjustment can be performed.

In a possible implementation, a TA offset of the NR SUL carrier is determined based on a TA offset of an NR UL carrier that corresponds to the same serving cell as the NR SUL carrier. Assuming that the TA offset of the NR UL is 13 µs, if a TAG to which the LTE UL carrier belongs still has at least one LTE TDD carrier, the TAG is the second TAG corresponding to the second network device, the TAG may be an sTAG or a pTAG, and $N_{TA\text{-}offset1}$ of the LTE UL carrier changes from 0 to a value equal to a TA offset of the LTE TDD carrier. Assuming that the TA offset of the LTE TDD carrier is 20 µs, the TA reference value delivered by the NR base station to the communications device is greater than or equal to 20 µs–13 µs=7 µs.

Figure 13:
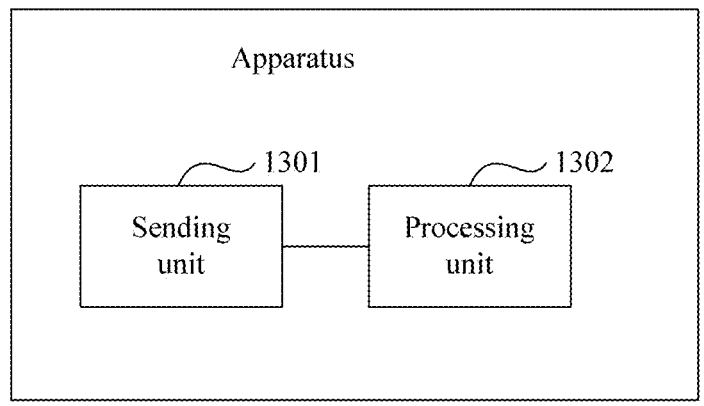
FIG. 13 is a schematic structural diagram 2 of an apparatus according to an embodiment of this application.

For the foregoing uplink synchronization method performed by the first network device, an embodiment of this application provides an apparatus. For specific contents performed by the apparatus, refer to the method embodiment shown in FIG. 11. FIG. 13 is a schematic structural diagram of an apparatus according to this application. The apparatus includes a sending unit 1301 and a processing unit 1302. In this embodiment of this application, these units may perform corresponding functions of the first network device in the embodiment in FIG. 11. For details, refer to the detailed descriptions in the embodiment. Details are not repeated herein.

Figure 14:
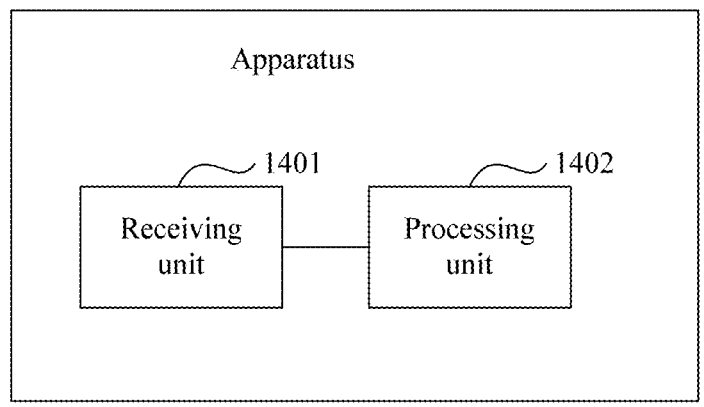
FIG. 14 is a schematic structural diagram 2 of another apparatus according to an embodiment of this application.

For the foregoing uplink synchronization method performed by the communications device, this application provides an apparatus. For specific content performed by the apparatus, refer to the foregoing method embodiment. FIG. 14 is a schematic structural diagram of an apparatus according to this application. The apparatus includes a receiving unit 1401 and a processing unit 1402. In this embodiment of this application, these units may perform corresponding functions of the communications device in the embodiment in FIG. 12. For details, refer to the detailed descriptions in the embodiment. Details are not repeated herein.

Figure 15:
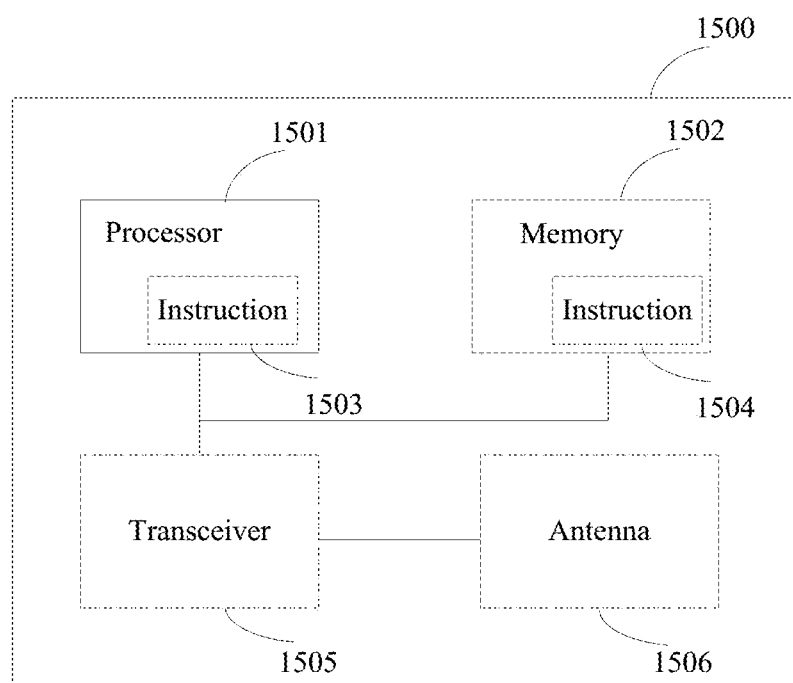
FIG. 15 is a schematic structural diagram of a communications apparatus according to an embodiment of this application.

An embodiment of this application further provides a communications apparatus. The communications apparatus includes a processor and a memory. The memory stores a computer program. When the processor reads and executes the computer program stored in the memory, the communications apparatus is enabled to implement the method performed by the first network device in the process shown in FIG. 11 or the method performed by the communications device in the process shown in FIG. 12. FIG. 15 is a schematic structural diagram of a communications apparatus 1500. The apparatus 1500 may be configured to implement the methods described in the foregoing method embodiments. For details, refer to the descriptions in the foregoing method embodiments. The communications apparatus 1500 may be a chip, a base station, a terminal, or another network device.

The communications apparatus 1500 includes one or more processors 1501. The processor 1501 may be a general-purpose processor, a special-purpose processor, or the like. For example, the processor 1501 may be a baseband processor or a central processing unit. The baseband processor may be configured to process a communication protocol and communication data, and the central processing unit may be configured to: control the communications apparatus (such as the base station, the terminal, or the chip), execute a software program, and process data of the software program.

In a possible design, one or more units shown in FIG. 13 and FIG. 14 may be implemented by using one or more processors, or one or more processors and memories.

In a possible design, the communications apparatus 1500 includes the one or more processors 1501, and the one or more processors 1501 may implement the foregoing uplink synchronization method. For example, the communications apparatus may be a base station. For determining of an uplink timing advance reference value and timing advance offset, refer to the descriptions in the related parts of FIG. 11 and FIG. 12. Details are not repeated herein.

Optionally, in a design, the processor 1501 may include an instruction 1503 (which may also be referred to as code or a program in some cases). The instruction may be run on the processor, so that the communications apparatus 1500 performs the methods described in the foregoing embodiments. In another possible design, the communications apparatus 1500 may further include a circuit, and the circuit may implement an uplink synchronization function in the foregoing embodiments.

Optionally, in a design, the communications apparatus 1500 may include one or more memories 1502. The memory 1502 stores an instruction 1504, and the instruction may be run on the processor, so that the communications apparatus 1500 performs the methods described in the foregoing method embodiments.

Optionally, the memory may further store data. Optionally, the processor may also store an instruction and/or data. The processor and the memory may be disposed separately or integrated together.

Optionally, the "storing" in the foregoing embodiment may mean storing in the memory 1502 or storing in another peripheral memory or storage device.

Optionally, the communications apparatus 1500 may further include a transceiver 1505 and an antenna 1506. The processor 1501 may be referred to as a processing unit, and may control the communications apparatus (the terminal or the base station). The transceiver 1505 may be referred to as a transceiver unit, a transceiver, a transceiver circuit, or the like, and is configured to implement a transmission and reception function of the communications apparatus by using the antenna 1506.

The specific implementations of the foregoing apparatus embodiment correspond to those of the method embodiments. For the specific implementations and beneficial effects of the apparatus embodiment, refer to the related descriptions in the method embodiments.

An embodiment of this application further provides a chip. The chip is connected to a memory, the memory stores a computer program, and the chip is configured to read and execute the computer program stored in the memory, to implement the method performed by the first network device in the process shown in FIG. 11 or the method performed by the communications device in the process shown in FIG. 12.

An embodiment of this application further provides a computer storage medium. The computer storage medium stores program code. When the stored program code is executed by a processor, the program code is used to implement the method performed by the first network device in the process shown in FIG. 11 in this application.

An embodiment of this application further provides a computer storage medium. The computer storage medium stores program code. When the stored program code is executed by a processor, the program code is used to implement the method performed by the communications device in the process shown in FIG. 12 in this application.

An embodiment of this application further provides a computer program product. The computer program product includes a computer software instruction, and the computer software instruction may be loaded by a processor to implement the method performed by the first network device in the process shown in FIG. 11 in this application.

An embodiment of this application further provides a computer program product. The computer program product includes a computer software instruction, and the computer software instruction may be loaded by a processor to implement the method performed by the communications device in the process shown in FIG. 12 in this application.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "comprising" (comprising) does not exclude another component or another step, and "a" or "one" does not exclude a case of plurality. A single processor or another unit may implement several functions enumerated in the claims. Some measures are recorded in dependent claims that are different from each other, but this does not mean that these measures cannot be combined to produce a better effect.

A person skilled in the art should understand that the embodiments of this application may be provided as a method, an apparatus (a device), or a computer program product. Therefore, this application may use a form of hardware only embodiments, software only embodiments, or embodiments with a combination of software and hardware. They are collectively referred to as "modules" or "systems". Moreover, this application may use a form of a computer program product that is implemented on one or more computer-usable storage media (including but not limited to a disk memory, a CD-ROM, an optical memory, and the like) that include computer usable program code. The computer program is stored/distributed in a proper medium and is provided as or used as a part of the hardware together with another hardware, or may use another distribution form, for example, by using the Internet or another wired or wireless telecommunications system.

This application is described with reference to the flowcharts and/or block diagrams of the method, the apparatus (device), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although this application is described with reference to specific features and the embodiments thereof, obviously, various modifications and combinations may be made to them without departing from the spirit and scope of this application. Correspondingly, the specification and accompanying drawings are merely example description of this application defined by the accompanying claims, and is considered as any of or all modifications, variations, combinations or equivalents that cover the scope of this application. Obviously, a person skilled in the art can make various modifications and variations to this application without departing from the spirit and scope of this application. In this way, this application is intended to cover these modifications and variations of this application provided that they fall within the scope of protection defined by the following claims and their equivalent technologies.

What is claimed is:

1. A method, comprising:
   receiving, by a communications device, a timing advance command from a network device, wherein the timing advance command comprises a timing advance (TA) reference value, and the TA reference value corresponds to a carrier in a timing advance group (TAG);
   determining, by the communications device, a TA offset of each carrier in the TAG based on carrier information of the respective carrier in the TAG; and
   adjusting, by the communications device, an uplink transmission timing of each carrier in the TAG based on the TA reference value and a maximum value of TA offsets of carriers in the TAG, wherein the maximum value of TA offsets is a maximum value of TA offsets of carriers serving the communications device in the TAG, the TA reference value corresponds to a carrier in the TAG, and the TA reference value is a difference between the uplink timing advance and the maximum TA offset.

2. The method according to claim 1, wherein determining, by the communications device, the TA offset of each carrier in the TAG based on the carrier information of the respective carrier in the TAG comprises:
   determining, by the communications device, the TA offset of each carrier in the TAG based on a frequency band of the respective carrier in the TAG, wherein a TA offset determined when the frequency band of the respective carrier is less than a frequency value is greater than a TA offset determined when the frequency band of the respective carrier is greater than or equal to the frequency value.

3. The method according to claim 1, wherein determining, by the communications device, the TA offset of each carrier in the TAG based on the carrier information of the respective carrier in the TAG comprises:
   determining, by the communications device, the TA offset of each carrier in the TAG based on a subcarrier spacing of the respective carrier in the TAG, wherein a TA offset determined when the subcarrier spacing of the respective carrier is less than a value is greater than a TA offset determined when the subcarrier spacing of the respective carrier is greater than or equal to the value.

4. The method according to claim 1, wherein the TAG is a primary TAG.

5. The method according to claim 1, wherein the TAG is a secondary TAG.

6. The method according to claim 1, wherein the TA offset of each carrier serving the communications device in the TAG is different.

7. A method, comprising:
determining, by a network device based on an uplink signal from a communications device, an uplink timing advance and a timing advance (TA) offset of each carrier in a timing advance group (TAG);
determining, by the network device, a TA reference value based on the uplink timing advance and a maximum TA offset, wherein the maximum TA offset is a maximum value of TA offsets of carriers serving the communications device in the TAG, the TA reference value corresponds to a carrier in the TAG, and the TA reference value is a difference between the uplink timing advance and the maximum TA offset; and
sending, by the network device, a timing advance command to the communications device, wherein the timing advance command comprises the TA reference value.

8. The method according to claim 7, wherein determining, by the network device based on the uplink signal from the communications device, the TA offset of each carrier in the TAG comprises:
determining, by the communications device, the TA offset of each carrier in the TAG based on a frequency band of the respective carrier in the TAG, wherein the TA offset determined when the frequency band of the respective carrier is less than a frequency value is greater than a TA offset determined when the frequency band of the respective carrier is greater than or equal to the frequency value.

9. The method according to claim 7, wherein determining, by the network device based on the uplink signal from the communications device, the TA offset of each carrier in the TAG based on the uplink signal from the communications device comprises:
determining, by the communications device, the TA offset of each carrier in the TAG based on a subcarrier spacing of the respective carrier in the TAG, wherein a TA offset determined when the subcarrier spacing of the respective carrier is less than a value is greater than a TA offset determined when the subcarrier spacing of the respective carrier is greater than or equal to the value.

10. The method according to claim 7, wherein the TAG is a primary TAG.

11. The method according to claim 7, wherein the TAG is a secondary TAG.

12. An apparatus, comprising:
a receiver, configured to receive a timing advance command from a network device, wherein the timing advance command comprises a timing advance (TA) reference value, and the TA reference value corresponds to a carrier in a timing advance group (TAG);
a processor; and
a non-transitory computer-readable storage medium storing a program to be executed by the processor, the program including instructions for:
determining a TA offset of each carrier in the TAG based on carrier information of the respective carrier in the TAG; and
adjusting an uplink transmission timing of each carrier in the TAG based on the TA reference value and a maximum value of TA offsets of carriers in the TAG, wherein the maximum value of TA offsets is a maximum value of TA offsets of carriers serving the apparatus in the TAG, the TA reference value corresponds to a carrier in the TAG, and the TA reference value is a difference between the uplink timing advance and the maximum TA offset.

13. The apparatus according to claim 12, wherein the program includes instructions for:
determining the TA offset of each carrier in the TAG based on a frequency band of the respective carrier in the TAG, wherein a TA offset determined when the frequency band of the respective carrier is less than a frequency value is greater than a TA offset determined when the frequency band of the respective carrier is greater than or equal to the frequency value.

14. The apparatus according to claim 12, wherein the program includes instructions for:
determining the TA offset of each carrier in the TAG based on a subcarrier spacing of the respective carrier in the TAG, wherein a TA offset determined when the subcarrier spacing of the respective carrier is less than a value is greater than the TA offset determined when the subcarrier spacing of the respective carrier is greater than or equal to the value.

15. The apparatus according to claim 12, wherein the TAG is a primary TAG.

16. The apparatus according to claim 12, wherein the TAG is a secondary TAG.

17. The apparatus according to claim 12, wherein the TA offset of each carrier serving the apparatus in the TAG is different.

18. An apparatus, comprising:
a processor;
a non-transitory computer-readable storage medium storing a program to be executed by the processor, the program including instructions for:
determining an uplink timing advance and a timing advance (TA) offset of each carrier in a timing advance group (TAG) based on an uplink signal from a communications device; and
determining a TA reference value based on the uplink timing advance and a maximum TA offset, wherein the maximum TA offset is a maximum value of TA offsets of carriers in the TAG serving the communications device, the TA reference value corresponds to a carrier in the TAG, and the TA reference value is a difference between the uplink timing advance and the maximum TA offset; and
a transmitter, configured to send a timing advance command to the communications device, wherein the timing advance command comprises the TA reference value.

19. The apparatus according to claim 18, wherein the program includes instructions for:
determining the TA offset of each carrier in the TAG based on a frequency band of the respective carrier in the TAG, wherein a TA offset determined when the frequency band of the carrier is less than a frequency value is greater than a TA offset determined when the frequency band of the carrier is greater than or equal to the frequency value.

20. The apparatus according to claim 18, wherein the program includes instructions for:

determining the TA offset of each carrier in the TAG based on a subcarrier spacing of the carrier in the TAG, wherein a TA offset determined when the subcarrier spacing of the respective carrier is less than a value is greater than the TA offset determined when the subcarrier spacing of the respective carrier is greater than or equal to the value.

* * * * *